(12) United States Patent
Yun et al.

(10) Patent No.: US 10,680,692 B2
(45) Date of Patent: Jun. 9, 2020

(54) METHOD FOR TRANSMITTING AND RECEIVING BEAMFORMING FEEDBACK INFORMATION IN A WIRELESS LOCAL ACCESS NETWORK SYSTEM AND DEVICES SUPPORTING THE SAME

(71) Applicant: LG ELECTRONICS INC., Seoul (KR)

(72) Inventors: Sunwoong Yun, Seoul (KR); Jinmin Kim, Seoul (KR); Eunsung Park, Seoul (KR); Dongguk Lim, Seoul (KR); Jinsoo Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 38 days.

(21) Appl. No.: 16/173,403

(22) Filed: Oct. 29, 2018

(65) Prior Publication Data

US 2019/0132034 A1    May 2, 2019

Related U.S. Application Data

(60) Provisional application No. 62/586,180, filed on Nov. 15, 2017, provisional application No. 62/579,916, filed on Nov. 1, 2017.

(51) Int. Cl.
*H04B 7/06* (2006.01)
*H04B 7/0417* (2017.01)
*H04W 72/04* (2009.01)
*H04B 7/0426* (2017.01)
*H04L 5/00* (2006.01)
*H04L 27/26* (2006.01)

(52) U.S. Cl.
CPC ........... *H04B 7/0617* (2013.01); *H04B 7/043* (2013.01); *H04B 7/0421* (2013.01); *H04B 7/063* (2013.01); *H04W 72/0453* (2013.01); *H04L 5/001* (2013.01); *H04L 27/2666* (2013.01)

(58) Field of Classification Search
CPC .................................................. H04B 7/0617
See application file for complete search history.

(56) References Cited

U.S. PATENT DOCUMENTS

2012/0039406 A1* 2/2012 Srinivasa ............ H04L 25/0206 375/260
2016/0295513 A1* 10/2016 Moon .................. H04B 7/0634
2016/0330047 A1* 11/2016 Seok .................... H04B 7/0634
2018/0323837 A1* 11/2018 Park .................... H04B 7/0452

* cited by examiner

*Primary Examiner* — John D Blanton
(74) *Attorney, Agent, or Firm* — Lee, Hong, Degerman, Kang & Waimey PC

(57) ABSTRACT

Disclosed herein are a method for transmitting and receiving beamforming feedback information in a wireless local access network system and devices supporting the same. Particularly, disclosed herein are a method for transmitting and receiving beamforming feedback information related to feedback subcarrier indices, where the feedback subcarrier indices is determined based on a $N_g$ value of subcarrier groupings and a number $N_{CB}$ of bonded channel.

19 Claims, 10 Drawing Sheets

| CH 1 | L-STF | L-CE | L-Header | ay Header A | ay STF | ay CE | ay Header B | ay payload |
|---|---|---|---|---|---|---|---|---|
| | GF-STF | GF-CE | | | | | | |
| CH 2 | L-STF | L-CE | L-Header | ay Header A | | | | |

(L: legacy, GF: gap filling, ay: 802.11ay)

METHOD FOR TRANSMITTING AND RECEIVING BEAMFORMING FEEDBACK INFORMATION IN A WIRELESS LOCAL ACCESS NETWORK SYSTEM AND DEVICES SUPPORTING THE SAME

Pursuant to 35 U.S.C. § 119(e), this application claims the benefit of U.S. Provisional Patent Application Nos. 62/579, 916, filed on Nov. 1, 2017 and 62/586,180, filed on Nov. 15, 2017, the contents of which are all hereby incorporated by reference herein in their entirety.

BACKGROUND OF THE INVENTION

Field of the Invention

The following description relates to an operation configuration of a station or access point in a wireless LAN (WLAN) system, and more particularly, to a method for transmitting and receiving beamforming feedback information in a station or access point in a WLAN system and devices supporting the same.

Discussion of the Related Art

Standards for the WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

Meanwhile, IEEE 802.11ad defines performance enhancement for high-speed throughput in the 60 GHz band, and IEEE 802.11ay, for introducing channel bonding and MIMO technology to IEEE 802.11ad systems for the first time, is being discussed.

SUMMARY OF THE INVENTION

An object of the present invention is to provide a method for transmitting and receiving beamforming feedback information in a wireless local access network system.

It will be appreciated by persons skilled in the art that the objects that could be achieved with the present disclosure are not limited to what has been particularly described hereinabove and the above and other objects that the present disclosure could achieve will be more clearly understood from the following detailed description.

The present invention provides a method and devices for transmitting and receiving beamforming feedback information in a wireless local access network system.

In one aspect of the present invention, a method for transmitting beamforming feedback information by a station (STA) in a wireless local access network (WLAN) system, the method comprises obtaining information on feedback subcarrier indices for the beamforming feedback information, based on a $N_g$ value of subcarrier groupings and a number $N_{CB}$ of bonded channel, wherein $N_{CB}$ is one of 1, 2, 3 and/or 4, and transmitting the beamforming feedback information comprising channel information related to the feedback subcarrier indices.

In another aspect of the present invention, a method for receiving beamforming feedback information by a station (STA) in a wireless local access network (WLAN) system, the method comprises receiving the beamforming feedback information comprising channel information related to a number $N_{CB}$ of bonded channel.

In another aspect of the present invention, a communication device for transmitting beamforming feedback information by a station (STA) in a wireless local access network (WLAN) system comprises a memory, and a processor operably coupled to the memory, wherein the processor is configured to obtain feedback subcarrier indices for the beamforming feedback information based on a $N_g$ value of subcarrier groupings and a number $N_{CB}$ of bonded channel, wherein $N_{CB}$ is one of 1, 2, 3 and/or 4, and transmit the beamforming feedback information comprising channel information related to the feedback subcarrier indices.

In another aspect of the present invention, a communication device for transmitting beamforming feedback information by a station (STA) in a wireless local access network (WLAN) system comprises a memory, and a processor operably coupled to the memory, wherein the processor is configured to receive the beamforming feedback information comprising channel information related to a number $N_{CB}$ of bonded channel.

In the present invention, the feedback subcarrier indices are determined like below.

When $N_{CB}$ is equal to 1, the feedback subcarrier indices based on $N_g$ comprises:
  A subcarrier index −177
  First subcarrier indices having the distance equal to multiple of $N_g$ from a subcarrier index −2 between the subcarrier index −177 and the subcarrier index −2
  The subcarrier index −2
  A subcarrier index 2
  Second subcarrier indices having the distance equal to multiple of $N_g$ from the subcarrier index 2 between the subcarrier index 2 and the subcarrier index 177
  A subcarrier index 177

And, as disclosed above, the feedback subcarrier indices based on $N_g$ may have a nested structure. That is, when $N_{CB}$ is equal to N+1 (where, N is equal to or larger than 1), the feedback subcarrier based on $N_g$ indices comprises:
  First feedback subcarrier indices based on $N_g$ in case that $N_{CB}$ is equal to N. Herein, the first feedback subcarrier indices based on $N_g$ comprises edge subcarrier indices based on $N_g$ in case that $N_{CB}$ is equal to N. The edge subcarrier indices based on $N_g$ in case that $N_{CB}$ is equal to N comprise a first edge subcarrier index and a second edge subcarrier index, and the first edge subcarrier index is smaller than the second edge subcarrier index.
  Edge subcarrier indices based on $N_g$ in case that $N_{CB}$ is equal to N+1. Herein, the edge subcarrier indices based on $N_g$ in case that $N_{CB}$ is equal to N+1 comprises a third edge subcarrier index and a fourth edge subcarrier index, and the third edge subcarrier index is smaller than the fourth edge subcarrier index.
  Third subcarrier indices having a distance equal to multiple of $N_g$ from the first edge subcarrier index between the first edge subcarrier index and the third edge subcarrier index Fourth subcarrier indices having the distance equal to multiple of $N_g$ from the second edge subcarrier index between the second edge subcarrier index and the fourth edge subcarrier index In the present invention, a value of $N_g$ is one of 2, 4 and/or 8.

In the first example of the present invention, edge subcarrier indices based on $N_g$ in case that $N_{CB}$ is equal to 2 may be subcarrier indices −386 and 386.

In the second example of the present invention, edge subcarrier indices based on $N_g$ in case that $N_{CB}$ is equal to 3 are subcarrier indices −596 and 596.

In the third example of the present invention, edge subcarrier indices based on $N_g$ in case that $N_{CB}$ is equal to 4 are subcarrier indices −805 and 805.

Specifically, when $N_g$ is 2 and $N_{CB}$ is 1, the feedback subcarrier indices may be configured like below:

[−177,−176,−174,−172,−170,−168,−166,−164,−162,−160,−158,−156,−154,−152,−150,−148,−146,−144,−142,−140,−138,−136,−134,−132,−130,−128,−126,−124,−122,−120,−118,−116,−114,−112,−110,−108,−106,−104,−102,−100,−98,−96,−94,−92,−90,−88,−86,−84,−82,−80,−78,−76,−74,−72,−70,−68,−66,−64,−62,−60,−58,−56,−54,−52,−50,−48,−46,−44,−42,−40,−38,−36,−34,−32,−30,−28,−26,−24,−22,−20,−18,−16,−14,−12,−10,−8,−6,−4,−2,2,4,6,8,10,12,14,16,18,20,22,24,26,28,30,32,34,36,38, 40,42,44,46,48,50,52,54,56,58,60,62,64,66,68,70,72,74,76,78,80,82,84,86,88,90, 92,94,96,98, 100,102,104,106,108,110,112,114,116,118, 120,122,124,126,128,130,132,134,136,138,140,14 2,144, 146,148,150,152,154,156,158,160,162,164,166,168,170, 172,174,176,177].

Specifically, when $N_g$ is 4 and $N_{CB}$ is 1, the feedback subcarrier indices may be configured like below:

[−177,−174,−170,−166,−162,−158,−154,−150,−146,−142,−138,−134,−130,−126,−122,−118,−114,−110,−106,−102,−98,−94,−90,−86,−82,−78,−74,−70,−66,−62,−58,−54,−50,−46,−42,−38,−34, −30,−26,−22,−18,−14,−10,−6,−2,2,6, 10,14,18,22,26,30,34,38,42,46,50,54,58,62,66,70,74,78, 82,8 6,90,94,98,102,106,110,114,118,122,126,130,134,138, 142,146,150,154,158,162,166,170,174, 177].

Specifically, when $N_g$ is 8 and $N_{CB}$ is 1, the feedback subcarrier indices may be configured like below:

[−177,−170,−162,−154,−146,−138,−130,−122,−114,−106,−98,−90,−82,−74,−66,−58,−50,−42,−34,−26,−18,−10,−2,2,10,18,26,34,42,50,58,66,74,82,90,98,106,114,122,130, 138,146,15 4,162,170,177].

Specifically, when $N_g$ is 2 and $N_{CB}$ is 2, the feedback subcarrier indices may be configured like below:

[−386,−385,−383,−381,−379,−377,−375,−373,−371,−369,−367,−365,−363,−361,−359,−357,−355,−353,−351,−349,−347,−345,−343,−341,−339,−337,−335,−333,−331,−329,−327,−325,−323,−321,−319,−317,−315,−313,−311,−309,−307,−305,−303,−301,−299,−297,−295,−293,−291,−289,−287,−285,−283,−281,−279,−277,−275,−273,−271,−269,−267,−265,−263,−261,−259,−257,−255,−253,−251,−249,−247,−245,−243,−241,−239,−237,−235,−233,−231,−229,−227,−225,−223,−221,−219,−217,−215,−213,−211,−209,−207,−205,−203,−201,−199,−197,−195,−193,−191,−189,−187,−185,−183,−181,−179,−177,−176,−174,−172,−170,−168,−166,−164,−162,−160,−158,−156,−154,−152,−150,−148,−146,−144,−142,−140,−138,−136,−134,−132,−130,−128,−126,−124,−122,−120,−118,−116,−114,−112,−110,−108, −106,−104,−102,−100,−98,−96,−94,−92,−90,−88,−86,−84,−82,−80,−78,−76,−74,−72,−70,−68,−66,−64,−62,−60,−58,−56,−54,−52,−50,−48,−46,−44,−42,−40,−38,−36,−34,−32,−30,−28,−26,−24,−22,−20,−18,−16,−14,−12,−10,−8,−6,−4,−2,2,4,6,8,10,12,14,16,18,20,22,24,26,28,30, 32,34,36,38,40,42,44,46,48, 50,52,54,56,58,60,62,64,66,68, 70,72,74,76,78,80,82,84,86,88,90,92,94,96,98,100,102,104, 6,108,110,112,114,116,118,120,122,124,126,128,130, 132,134,136,138,140,142,144,146,148, 150,152,154,156, 158,160,162,164,166,168,170,172,174,176,177,179,181, 183,185,187,189,1 91,193,195,197,199,201,203,205,207, 209,211,213,215,217,219,221,223,225,227,229,231,23 3,235,237,239,241,243,245,247,249,251,253,255,257,259, 261,263,265,267,269,271,273,275, 277,279,281,283,285, 287,289,291,293,295,297,299,301,303,305,307,309,311, 313,315,317,3 19,321,323,325,327,329,331,333,335,337, 339,341,343,345,347,349,351,353,355,357,359,36 1,363, 365,367,369,371,373,375,377,379,381,383,385,386].

Specifically, when $N_g$ is 4 and $N_{CB}$ is 2, the feedback subcarrier indices may be configured like below:

[−386,−385,−381,−377,−373,−369,−365,−361,−357,−353,−349,−345,−341,−337,−333,−329,−325,−321,−317,−313,−309,−305,−301,−297,−293,−289,−285,−281,−277,−273,−269,−265,−261,−257,−253,−249,−245,−241,−237,−233,−229,−225,−221,−217,−213,−209,−205,−201,−197,−193,−189,−185,−181,−177,−174,−170,−166,−162,−158,−154,−150,−146,−142,−138,−134,−130,−126,−122,−118,−114,−110,−106,−102,−98,−94,−90,−86,−82,−78,−74,−70,−66,−62,−58,−54,−50,−46,−42,−38,−34,−30,−26,−22,−18,−14,−10,−6,−2,2,6,10,14,18,22,26,30,34,38,42,46,50,54,58, 62,66,70,74,78,82,86,90, 94,98,102,106,110,114,118,122, 126,130,134,138,142,146,150,154,158,162,166,170,174, 177, 181,185,189,193,197,201,205,209,213,217,221,225, 229,233,237,241,245,249,253,257,261,2 65,269,273,277, 281,285,289,293,297,301,305,309,313,317,321,325,329, 333,337,341,345,34 9,353,357,361,365,369,373,377,381, 385,386].

Specifically, when $N_g$ is 8 and $N_{CB}$ is 2, the feedback subcarrier indices may be configured like below:

[−386,−385,−377,−369,−361,−353,−345,−337,−329,−321,−313,−305,−297,−289,−281,−273,−265,−257,−249,−241,−233,−225,−217,−209,−201,−193,−185,−177,−170,−162,−154,−146,−138,−130,−122,−114,−106,−98,−90,−82,−74,−66,−58,−50,−42,−34,−26,−18,−10,−2,2,10,18,26,34,42, 50,5 8,62,70,78,86,94,102,110,118,126,134,142,150,158, 166,174,177,185,193,201,209,217,225,2 33,241,249,257, 265,273,281,289,297,305,313,321,329,337,345,353,361, 369,377,385,386].

Specifically, when $N_g$ is 2 and $N_{CB}$ is 3 the feedback subcarrier indices may be configured like below:

[−596,−594,−592,−590,−588,−586,−584,−582,−580,−578,−576,−574,−572,−570,−568,−566,−564,−562,−560,−558,−556,−554,−552,−550,−548,−546,−544,−542,−540,−538,−536,−534,−532,−530,−528,−526,−524,−522,−520,−518,−516,−514,−512,−510,−508,−506,−504,−502,−500,−498,−496,−494,−492,−490,−488,−486,−484,−482,−480,−478,−476,−474,−472,−470,−468,−466,−464,−462,−460,−458,−456,−454,−452,−450,−448,−446,−444,−442,−440,−438,−436,−434,−432,−430,−428,−426,−424,−422,−420,−418,−416,−414,−412,−410,−408,−406,−404,−402,−400,−398,−396,−394,−392,−390,−388,−386,−385,−383,−381,−379,−377,−375,−373,−371,−369,−367,−365,−363,−361,−359,−357,−355,−353,−351,−349,−347,−345,−343,−341,−339,−337,−335,−333,−331,−329,−327,−325,−323,−321,−319,−317,−315,−313,−311,−309,−307,−305,−303,−301,−299,−297,−295,−293,−291,−289,−287,−285,−283,−281,−279,−277,−275,−273,−271,−269,−267,−265,−263,−261,−259,−257,−255,−253,−251,−249,−247,−245,−243,−241,−239,−237,−235,−233,−231,−229,−227,−225,−223,−221,−219,−217,−215,−213,−211,−209,−207,−205,−203,−201,−199,−197,−195,−193,−191,−189,−187,−185,−183,−181,−179,−177,−176,−174,−172,−170,−168,−166,−164,−162,−

160,−158,−156,−154,−152,−150,−148,−146,−144,−142,−140,−138,−136,−134,−132,−130,−128,−126,−124,−122,−120,−118,−116,−114,−112,−110,−108,−106,−104,−102,−100,−98,−96,−94,−92,−90,−88,−86,−84,−82,−80,−78,−76,−74,−72,−70,−68,−66,−64,−62,−60,−58,−56,−54,−52,−50,−48,−46,−44,−42,−40,−38,−36,−34,−32,−30,−28,−26,−24,−22,−20,−18,−16,−14,−12,−10,−8,−6,−4,−2,2,4,6,8,10,12,14,16,18,20,22,24,26,28,30,32,34,36,38,40,42,44,46,48,50,52,54,56,58, 60,62,64,66,68,70,72,74,76,78,80,82,84,86,88,90,92,94,96,98,100,102,104,106,108,110,112, 114,116,118,120,122,124,126,128,130,132,134,136,138,140,142,144,146,148,150,152,154,1 56,158,160,162,164,166,168,170,172,174,176,177,179,181,183,185,187,189,191,193, 195,19 7,199,201,203,205,207,209,211,213,215,217,219,221,223,225,227,229,231,233,235,237,239, 241,243,245,247,249,251,253,255,257,259,261,263,265,267,269,271,273,275,277,279,281,2 83,285,287,289,291,293,295,297,299,301,303,305,307,309,311,313,315,317,319,321,323,32 5,327,329,331,333,335,337,339,341,343,345,347,349,351,353,355,357,359,361,363,365,367, 369,371,373,375,377,379,381,383,385,386,388,390,392,394,396,398,400,402,404,406,408,4 10,412,414,416,418,420,422,424,426,428,430,432,434,436,438,440,442,444,446,448,450,45 2,454,456,458,460,462,464,466,468,470,472,474,476,478,480,482,484,486,488,490,492,494, 496,498,500,502,504,506,508,510,512,514,516,518,520,522,524,526,528,530,532, 534,536,5 38,540,542,544,546,548,550,552,554,556,558,560,562,564,566,568,570,572,574,576,578,58 0,582,584,586,588,590,592,594,596].

Specifically, when $N_g$ is 4 and $N_{CB}$ is 3 the feedback subcarrier indices may be configured like below:

[−596,−594,−590,−586,−582,−578,−574,−570,−566,−562,−558,−554,−550,−546,−542,−538,−534,−530,−526,−522,−518,−514,−510,−506,−502,−498,−494,−490,−486,−482,−478,−474,−470,−466,−462,−458,−454,−450,−446,−442,−438,−434,−430,−426,−422,−418,−414,−410,−406,−402,−398,−394,−390,−386,−385,−381,−377,−373,−369,−365,−361,−357,−353,−349,−345,−341,−337,−333,−329,−325,−321,−317,−313,−309,−305,−301,−297,−293,−289,−285,−281,−277,−273,−269,−265,−261,−257,−253,−249,−245,−241,−237,−233,−229,−225,−221,−217,−213,−209,−205,−201,−197,−193,−189,−185,−181,−177,−174,−170,−166,−162,−158,−154,−150,−146,−142,−138,−134,−130,−126,−122,−118,−114,−110,−106,−102,−98,−94,−90,−86,−82,−78,−74,−70,−66,−62,−58,−54,−50,−46,−42,−38,−34,−30,−26,−2 2,−18,−14,−10,−6,−2,2,6,10,14,18,22,26,30,34,38,42,46,50,54,58,62,66,70,74,78,82,86,90,94,9 8,102,106,110,114,118,122,126,130,134,138,142,146,150,154,158,162,166,170,174,177,181, 185,189,193,197,201,205,209,213,217,221,225,229,233,237,241,245,249,253,257,261,265,2 69,273,277,281,285,289,293,297,301,305,309,313,317,321,325,329,333,337,341,345,349,35 3,357,361,365,369,373,377,381,385,386,390,394,398,402,406,410,414,418,422,426,430,434, 438,442,446,450,454,458,462,466,470,474,478,482,486,490,494,498,502,506,510,514,518,5 22,526,530,534,538,542,546,550,554,558,562,566,570,574,578,582,586,590,594,596].

Specifically, when $N_g$ is 8 and $N_{CB}$ is 3, the feedback subcarrier indices may be configured like below:

[−596,−594,−586,−578,−570,−562,−554,−546,−538,−530,−522,−514,−506,−498,−490,−482,−474,−466,−458,−450,−442,−434,−426,−418,−410,−402,−394,−386,−385,−377,−369,−361,−353,−345,−337,−329,−321,−313,−305,−297,−289,−281,−273,−265,−257,−249,−241,−233,−225,−217,−209,−201,−193,−185,−177,−170,−162,−154,−146,−138,−130,−122,−114,−106,−98,−90,−82,−74,−66,−58,−50,−42,−34,−26,−18,−10,−2,2,10,18,26,34,42,50,58,62,70, 78,86,94,102,110,118,126,134,142,15 0,158,166,174,177, 185,193,201,209,217,225,233,241,249,257,265,273,281, 289,297,305,313, 321,329,337,345,353,361,369,377,385, 386,394,402,410,418,426,434,442,450,458,466,474,4 82,490,498,506,514,522,530,538,546,554,562,570,578,586, 594,596].

Specifically, when $N_g$ is 2 and $N_{CB}$ is 4, the feedback subcarrier indices may be configured like below:

[−805,−804,−802,−800,−798,−796,−794,−792,−790,−788,−786,−784,−782,−780,−778,−776,−774,−772,−770,−768,−766,−764,−762,−760,−758,−756,−754,−752,−750,−748,−746,−744,−742,−740,−738,−736,−734,−732,−730,−728,−726,−724,−722,−720,−718,−716,−714,−712,−710,−708,−706,−704,−702,−700,−698,−696,−694,−692,−690,−688,−686,−684,−682,−680,−678,−676,−674,−672,−670,−668,−666,−664,−662,−660,−658,−656,−654,−652,−650,−648,−646,−644,−642,−640,−638,−636,−634,−632,−630,−628,−626,−624,−622,−620,−618,−616,−614,−612,−610,−608,−606,−604,−602,−600,−598,−596,−594,−592,−590,−588,−586,−584,−582,−580,−578,−576,−574,−572,−570,−568,−566,−564,−562,−560,−558,−556,−554,−552,−550,−548,−546,−544,−542,−540,−538,−536,−534,−532,−530,−528,−526,−524,−522,−520,−518,−516,−514,−512,−510,−508,−506,−504,−502,−500,−498,−496,−494,−492,−490,−488,−486,−484,−482,−480,−478,−476,−474,−472,−470,−468,−466,−464,−462,−460,−458,−456,−454,−452,−450,−448,−446,−444,−442,−440,−438,−436,−434,−432,−430,−428,−426,−424,−422,−420,−418,−416,−414,−412,−410,−408,−406,−404,−402,−400,−398,−396,−394,−392,−390,−388,−386,−385,−383,−381,−379,−377,−375,−373,−371,−369,−367,−365,−363,−361,−359,−357,−355,−353,−351,−349,−347,−345,−343,−341,−339,−337,−335,−333,−331,−329,−327,−325,−323,−321,−319,−317,−315,−313,−311,−309,−307,−305,−303,−301,−299,−297,−295,−293,−291,−289,−287,−285,−283,−281,−279,−277,−275,−273,−271,−269,−267,−265,−263,−261,−259,−257,−255,−253,−251,−249,−247,−245,−243,−241,−239,−237,−235,−233,−231,−229,−227,−225,−223,−221,−219,−217,−215,−213,−211,−209,−207,−205,−203,−201,−199,−197,−195,−193,−191,−189,−187,−185,−183,−181,−179,−177,−176,−174,−172,−170,−168,−166,−164,−162,−160,−158,−156,−154,−152,−150,−148,−146,−144,−142,−140,−138,−136,−134,−132,−130,−128,−126,−124,−122,−120,−118,−116,−114,−112,−110,−108,−106,−104,−102,−100,−98,−96,−9 4,−92,−90,−88,−86,−84,−82,−80,−78,−76,−74,−72,−70,−68,−66,−64,−62,−60,−58,−56,−54,−52,−50,−48,−46,−44,−42,−40,−38,−36,−34,−32,−30,−28,−26,−24,−22,−20,−18,−16,−14,−12,−10,−8,−6,−4,−2,2,4,6,8,1 0,12,14,16,18,20,22,24,26,28,30,32,34,36,38,40,42,44,46,48,50,52,54,56,58,60,62,64,66, 68,7 0,72,74,76,78,80,82,84,86,88,90,92,94,96,98,100,102, 104,106,108,110,112,114,116,118,120, 122,124,126,128, 130,132,134,136,138,140,142,144,146,148,150,152,154, 156,158,160,162,1 64,166,168,170,172,174,176,177,179, 181,183,185,187,189,191,193,195,197,199,201,203,20 5,207,209,211,213,215,217,219,221,223,225,227,229,231, 233,235,237,239,241,243,245,247, 249,251,253,255,257, 259,261,263,265,267,269,271,273,275,277,279,281,283, 285,287,289,2 91,293,295,297,299,301,303,305,307,309, 311,313,315,317,319,321,323,325,327,329,331,33 3,335, 337,339,341,343,345,347,349,351,353,355,357,359,361, 363,365,367,369,371,373,375, 377,379,381,383,385,386, 388,390,392,394,396,398,400,402,404,406,408,410,412, 414,416,4 18,420,422,424,426,428,430,432,434,436,438, 440,442,444,446,448,450,452,454,456,458,46 0,462,464, 466,468,470,472,474,476,478,480,482,484,486,488,490, 492,494,496,498,500,502, 504,506,508,510,512,514,516, 518,520,522,524,526,528,530,532,534,536,538,540,542, 544,5 46,548,550,552,554,556,558,560,562,564,566,568, 570,572,574,576,578,580,582,584,586,58 8,590,592,594, 596,598,600,602,604,606,608,610,612,614,616,618,620, 622,624,626,628,630, 632,634,636,638,640,642,644,646, 648,650,652,654,656,658,660,662,664,666,668,670,672,6 74,676,678,680,682,684,686,688,690,692,694,696,698,700, 702,704,706,708,710,712,714,71 6,718,720,722,724,726, 728,730,732,734,736,738,740,742,744,746,748,750,752, 754,756,758, 760,762,764,766,768,770,772,774,776,778, 780,782,784,786,788,790,792,794,796,798,800,8 02,804, 805].

Specifically, when $N_g$ is 4 and $N_{CB}$ is 4, the feedback subcarrier indices may be configured like below:

[−805,−804,−800,−796,−792,−788,−784,−780,−776,− 772,−768,−764,−760,−756,−752,−748,−744,−740,−736,− 732,−728,−724,−720,−716,−712,−708,−704,−700,−696,− 692,−688,−684,−680,−676,−672,−668,−664,−660,−656,− 652,−648,−644,−640,−636,−632,−628,−624,−620,−616,− 612,−608,−604,−600,−596,−594,−590,−586,−582,−578,− 574,−570,−566,−562,−558,−554,−550,−546,−542,−538,− 534,−530,−526,−522,−518,−514,−510,−506,−502,−498,− 494,−490,−486,−482,−478,−474,−470,−466,−462,−458,− 454,−450,−446,−442,−438,−434,−430,−426,−422,−418,− 414,−410,−406,−402,−398,−394,−390,−386,−385,−381,− 377,−373,−369,−365,−361,−357,−353,−349,−345,−341,− 337,−333,−329,−325,−321,−317,−313,−309,−305,−301,− 297,−293,−289,−285,−281,−277,−273,−269,−265,−261,− 257,−253,−249,−245,−241,−237,−233,−229,−225,−221,− 217,−213,−209,−205,−201,−197,−193,−189,−185,−181,− 177,−174,−170,−166,−162,−158,−154,−150,−146,−142,− 138,−134,−130,−126,−122,−118,−114,−110,−106,−102,− 98,−94,−90,−86,−82,−78,−74,−70,−66,−62,−58,−54,−50,− 46,−42,−38,−34,−30,−26,−22,−18,−14,−10,−6,−2,2,6,10, 14,18,22,26,30,34,38,42,46,50,54,58,62,66,70,74,78,82,86, 90,94,98,102, 106,110,114,118,122,126,130,134,138,142, 146,150,154,158,162,166,170,174,177,181,185,1 89,193, 197,201,205,209,213,217,221,225,229,233,237,241,245, 249,253,257,261,265,269,27 3,277,281,285,289,293,297, 301,305,309,313,317,321,325,329,333,337,341,345,349, 353,357, 361,365,369,373,377,381,385,386,390,394,398, 402,406,410,414,418,422,426,430,434,438,4 42,446,450, 454,458,462,466,470,474,478,482,486,490,494,498,502, 506,510,514,518,522,52 6,530,534,538,542,546,550,554, 558,562,566,570,574,578,582,586,590,594,596,596,600, 604, 608,612,616,620,624,628,632,636,640,644,648,652, 656,660,664,668,672,676,680,684,688,6 92,696,700,704, 708,712,716,720,724,728,732,736,740,744,748,752,756, 760,764,768,772,77 6,780,784,788,792,796,800,804,805].

Specifically, when Ng is 8 and $N_{CB}$ is 4, the feedback subcarrier indices may be configured like below:

[−805,−804,−796,−788,−780,−772,−764,−756,−748,− 740,−732,−724,−716,−708,−700,−692,−684,−676,−668,− 660,−652,−644,−636,−628,−620,−612,−604,596,−594,− 586,−578,−570,−562, −554,−546,−538,−530,−522,−514,− 506,−498,−490,−482,−474,−466,−458,−450,−442,−434,− 426,−418, −410,−402,−394,−386,−385,−377,−369,−361,− 353,−345,−337,−329,−321,−313,−305,−297,−289,−281,− 273,−265,−257,−249,−241,−233,−225,−217,−209,−201,− 193,−185,−177,−170,−162,−154,−146,−138, −130,−122,− 114,−106,−98,−90,−82,−74,−66,−58,−50,−42,−34,−26,− 18,−10,−2,2,10,18,26,34,42,50,5 8,62,70,78,86,94,102,110, 118,126,134,142,150,158,166,174,177,185,193,201,209, 217,225,2 33,241,249,257,265,273,281,289,297,305,313, 321,329,337,345,353,361,369,377,385,386,39 4,402,410, 418,426,434,442,450,458,466,474,482,490,498,506,514, 522,530,538,546,554,562, 570,578,586,594,596,604,612, 620,628,636,644,652,660,668,676,684,692,700,708,716, 724,7 32,740,748,756,764,772,780,788,796,804,805].

It is to be understood that both the foregoing general description and the following detailed description of the present disclosure are exemplary and explanatory and are intended to provide further explanation of the disclosure as claimed.

As is apparent from the above description, the embodiments of the present disclosure have the following effects.

According to embodiments of the present invention, the beamforming feedback information is configured for a part of subcarriers, not all subcarriers in corresponding channel. Especially, based on the nested structure, the communication device can easily determine feedback subcarrier indices, in technical view of hardware implementation.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, a detailed description will be given of the introduction of the concept of a downlink oriented channel, and a method and apparatus for conducting communication using a downlink oriented channel in a high-density Wireless Local Area Network (WLAN) system.

1. Wireless LAN (WLAN) System

1-1. Generals of WLAN System

Figure 1:
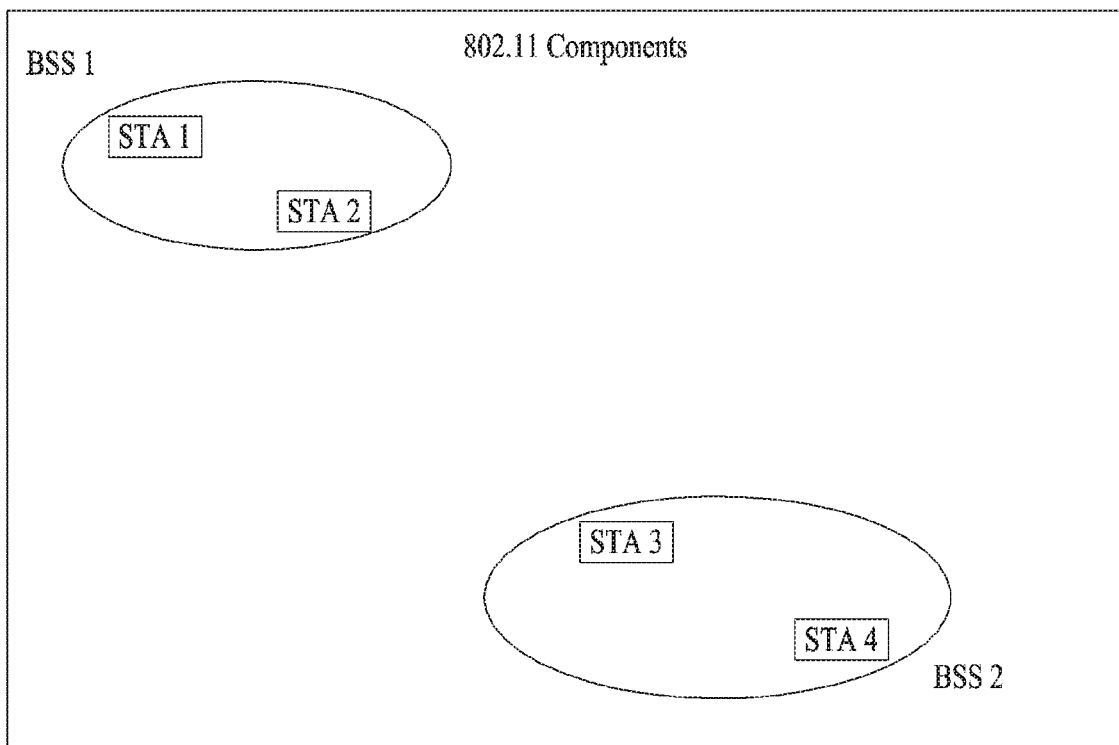
FIG. 1 is a diagram illustrating an exemplary configuration of a Wireless Local Area Network (WLAN) system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Medium Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
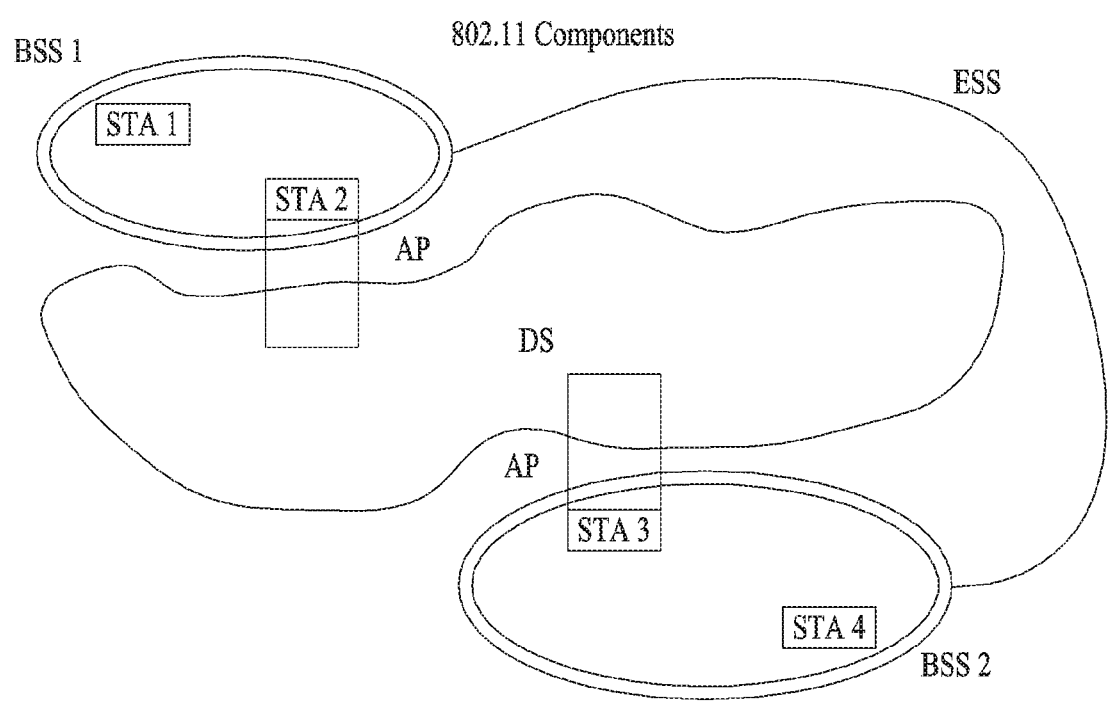
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above, a method of channel bonding in the WLAN system will be described.

1-2. Channel Bonding in WLAN System

Figure 3:
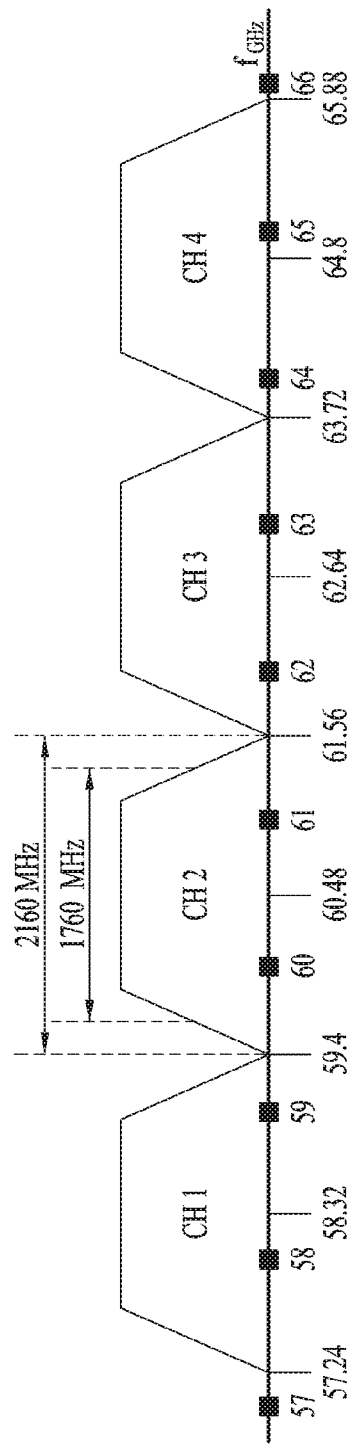
FIG. 3 is a diagram illustrating a channel in a 60 GHz band for explaining a channel bonding operation according to an embodiment of the present invention.

FIG. 3 is a diagram illustrating a channel in a 60 GHz band for explaining a channel bonding operation according to an embodiment of the present invention.

As shown in FIG. 3, four channels may be configured in the 60 GHz band, and the typical channel bandwidth may be 2.16 GHz. The ISM band (57 GHz to 66 GHz) available at 60 GHz may be specified differently for different countries. In general, channel 2 of the channels shown in FIG. 3 is available in all regions and may be used as a default channel. Most of the regions, except Australia, may use channels 2 and 3, which may be utilized for channel bonding. However, the channels used for channel bonding may vary, and the present invention is not limited to a specific channel.

Figure 4:
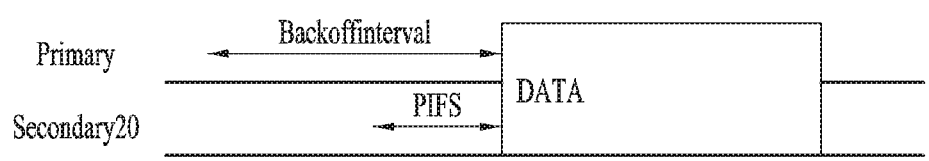
FIG. 4 illustrates a basic method of performing channel bonding in a WLAN system.

FIG. 4 illustrates a basic method of performing channel bonding in a WLAN system.

The example of FIG. 4 illustrates the operation of 40 MHz channel bonding performed by combining two 20 MHz channels in the IEEE 802.11n system. For IEEE 802.11ac, 40/80/160 MHz channel bonding may be performed.

The two channels exemplarily shown in FIG. 4 include a primary channel and a secondary channel, and the STA may review the channel status of the primary channel of the two channels in the CSMA/CA manner. If the secondary channel is idle for a predetermined time (e.g., PIFS) while the primary channel is idle during a certain backoff interval and the backoff count becomes 0, the STA may transmit data by bonding the primary channel and the secondary channel.

In the case where channel bonding is performed based on contention as shown in FIG. 4, channel bonding is allowed only when the secondary channel remains idle for a predetermined time at the time when the backoff count for the primary channel expires, and therefore the application of channel bonding is very limited, and it is difficult to flexibly cope with the media situation.

Accordingly, in one aspect of the present invention, an AP may transmit scheduling information to STAs to perform access based on scheduling. Meanwhile, in another aspect of the present invention, channel access may be performed based on the above-described scheduling or on contention independently of the above-described scheduling. In yet another aspect of the present invention, communication may be performed based on beamforming using a spatial sharing technique.

1-3. Beacon Interval Configuration

Figure 5:
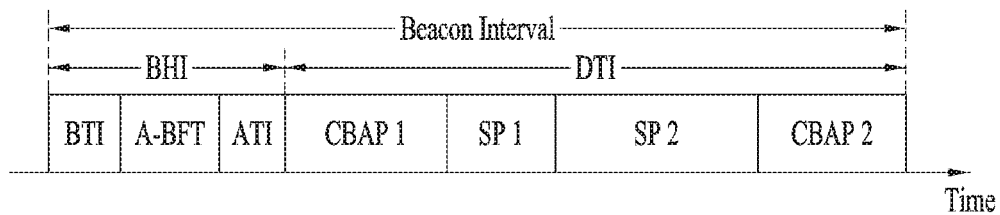
FIG. 5 is a diagram illustrating configuration of a beacon interval.

FIG. 5 is a diagram illustrating configuration of a beacon interval.

In 11ad-based DMG BSS systems, the media time may be divided into beacon intervals. The sub-intervals within a beacon interval may be referred to as access periods. Different access intervals within one beacon interval may have different access rules. The information on the access intervals may be transmitted to a non-AP STA or a non-PCP by the AP or Personal Basic Service Set Control Point (PCP).

As shown in FIG. 5, one beacon interval may include one beacon header interval (BHI) and one data transfer interval (DTI). The BHI may include a beacon transmission interval (BTI), an association beamforming training (A-BFT) interval, and an announcement transmission interval (ATI) as shown in FIG. 4.

The BTI refers to an interval during which one or more DMG beacon frames may be transmitted. The A-BFT interval refers to an interval during which beamforming training is performed by an STA that has transmitted the DMG beacon frame during the preceding BTI. The ATI refers to a request-response-based management access interval between a PCP/AP and a non-PCP/non-AP STA.

Meanwhile, the data transfer interval (DTI) is an interval during which frame exchange is performed between STAs, and may be allocated one or more Contention Based Access Periods (CBAPs) and one or more service periods (SPs) as shown in FIG. 5. Although FIG. 5 illustrates an example of allocation of two CBAPs and two SPs, this is illustrative and not restrictive.

Hereinafter, the physical layer configuration in a WLAN system to which the present invention is applied will be described in detail.

1-4. Physical Layer Configuration

It is assumed that the following three different modulation modes may be provided in the WLAN system according to an embodiment of the present invention.

TABLE 1

| PHY | MCS | Note |
| --- | --- | --- |
| Control PHY | 0 | |
| Single carrier PHY | 1 ... 12 | (low power SC PHY) |
| (SC PHY) | 25 ... 31 | |
| OFDM PHY | 13 ... 24 | |

Such modulation modes may be used to satisfy different requirements (e.g., high throughput or stability). Depending on the system, only some of these modes may be supported.

Figure 6:
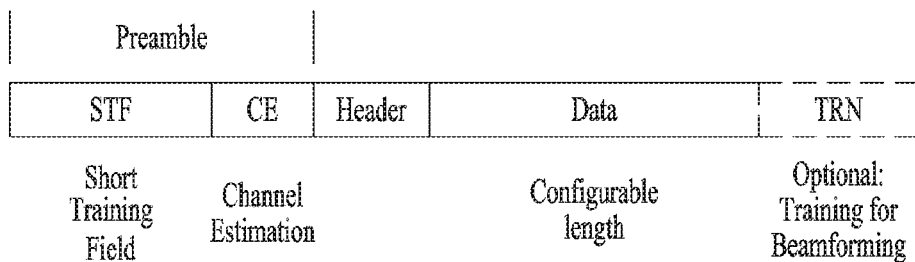
FIG. 6 is a diagram illustrating a physical configuration of an existing radio frame.

FIG. 6 is a diagram illustrating a physical configuration of an existing radio frame.

It is assumed that all the Directional Multi-Gigabit (DMG) physical layers include fields as shown in FIG. 6 in common. However, depending on the respective modes, physical layers may have a different method of defining individual fields and use a different modulation/coding scheme.

As shown in FIG. 6, the preamble of a radio frame may include a Short Training Field (STF) and Channel Estimation (CE). In addition, the radio frame may include a header and a data field as payload, and selectively include a TRN (Training) field for beamforming.

Figure 7:
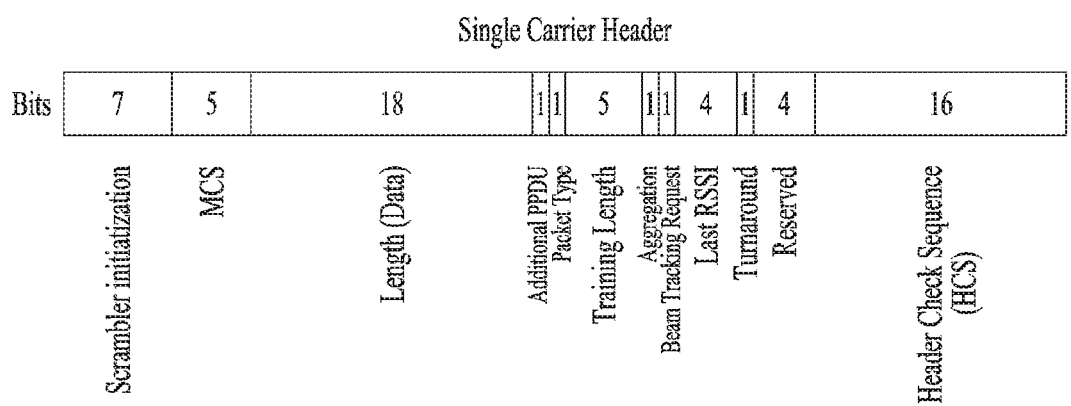
FIGS. 7 and 8 are diagrams illustrating configuration of the header field of the radio frame of FIG. 6.
Figures 8, 9:
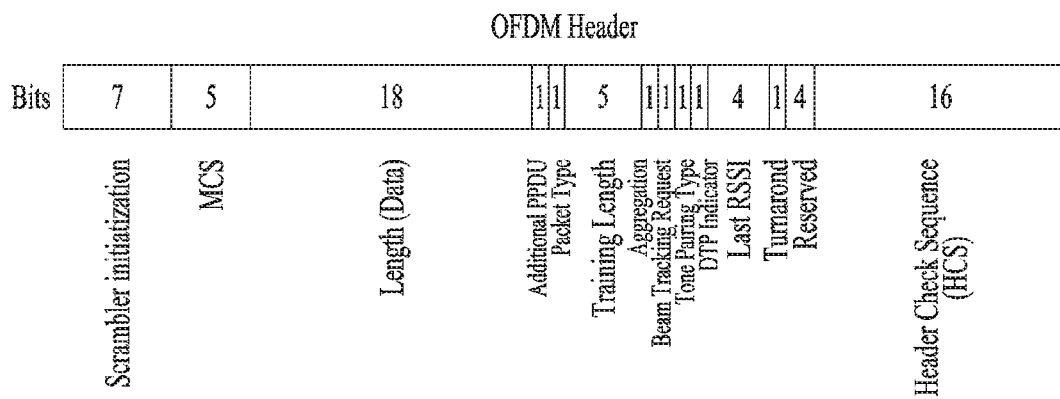
FIG. 9 is a diagram showing a PPDU structure applicable to the present invention.

FIGS. 7 and 8 are diagrams illustrating configuration of the header field of the radio frame of FIG. 6.

Specifically, FIG. 7 illustrates a case where an Single Carrier (SC) mode is used. In the SC mode, the header may include information indicating an initial value of scrambling, a Modulation and Coding Scheme (MCS), information indicating the length of data, information indicating the presence or absence of an additional Physical Protocol Data Unit (PPDU), a packet type, a training length, an aggregation status, a beam tracking request status, a last Received Signal Strength Indicator (RSSI), a truncation status, and a Header Check Sequence (HCS). In addition, as shown in FIG. 7, the header has 4 reserved bits. The reserved bits may be utilized in the following description.

FIG. 8 specifically illustrates configuration of a header in a case where the OFDM mode is applied. The OFDM header may include information indicating an initial value of scrambling, an MCS, information indicating the length of data, information indicating the presence or absence of additional PPDU, a packet type, a training length, an aggregation status, a beam tracking request status, a last RSSI, a truncation status, and an HCS. In addition, as shown in FIG. 8, the header has 2 reserved bits. The reserved bits may be utilized in the following description as in the case of FIG. 7.

As described above, the IEEE 802.11ay system is considering introduction of channel bonding and MIMO technology in the legacy 11ad system for the first time. In order to implement channel bonding and MIMO in 11ay, a new PPDU structure is needed. In other words, the existing 11ad PPDU structure has limitations in supporting legacy UEs and implementing channel bonding and MIMO.

For this, a legacy preamble for supporting a legacy UE and a new field for an 11ay UE following a legacy header field may be defined, and channel bonding and MIMO may be supported through the newly defined field.

FIG. 9 is a diagram showing a PPDU structure according to a preferred embodiment of the present invention. In FIG. 9, the abscissa may correspond to the time domain, and the ordinate may correspond to the frequency domain.

When two or more channels are bonded, a frequency band (for example, a 400 MHz band) may exist between frequency bands (e.g., 1.83 GHz) used in the respective channels. In the mixed mode, a legacy preamble (legacy STF, legacy CE) is transmitted in duplicate through each channel. In an embodiment of the present invention, transmitting the new STF and CE field (gap filling) preamble through the 400 MHz band between the channels along with transmission of the legacy preamble may be considered.

In this case, as shown in FIG. 9, in the PPDU structure according to the present invention, ay STF, ay CE, ay header B, and payload are transmitted over broadband after a legacy preamble, a legacy header and an ay header A. Therefore, the ay header, ay Payload field, and the like to be transmitted after the header field may be transmitted through channels used for bonding. In order to distinguish the ay header from the legacy header, the ay header may be referred to as an enhanced directional multi-gigabit (EDMG) header, or "ay header" and "EDMG header" may be interchangeably used.

For example, a total of six channels (2.16 GHz) may be present in 11ay, and up to four channels may be bonded and transmitted to a single STA. Thus, the ay header and the ay payload may be transmitted over bandwidths of 2.16 GHz, 4.32 GHz, 6.48 GHz, and 8.64 GHz.

Alternatively, the PPDU format used when the legacy preamble is repeatedly transmitted without performing the gap-filling described above may also be considered.

In this case, the gap-filling is not performed, and thus the ay STF, ay CE, and ay header B are transmitted in a wideband after the legacy preamble, legacy header, and ay header A, without the GF-STF and GF-CE field indicated by the dotted line in FIG. 9.

Figure 10:
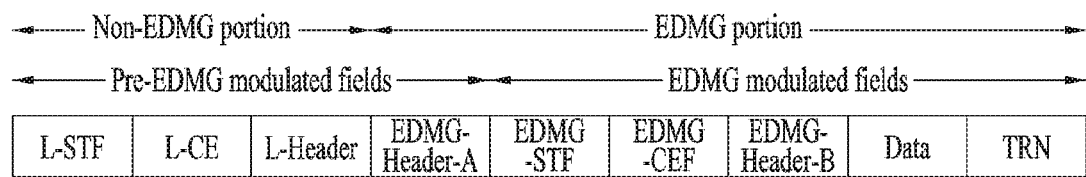
FIG. 10 is a diagram illustrating a PPDU structure applicable to the present invention.

FIG. 10 is a diagram simply illustrating a PPDU structure applicable to the present invention. The aforementioned PPDU format may simply be described with reference to FIG. 10.

As shown in FIG. 10, the PPDU format applicable to an flay system may include L-STF, L-CE, L-Header, EDMG-Header-A, EDMG-STF, EDMG-CEF, EDMG-Header-B, Data, and TRN fields, wherein these fields may selectively be included in the PPDU format in accordance with a format (e.g., SU PPDU, MU PPDU, etc.) of the PPDU.

In this case, a portion that includes the L-STF, L-CE, and L-header fields may be referred to as a Non-EDMG portion, and the other portions may be referred to as EDMG portions. Also, the L-STF, L-CE, L-Header, and EDMG- Header-A fields may be referred to as pre-EDMG modulated fields, and the other portions may be referred to as EDMG modulated fields.

The (legacy) preamble is the part of the PPDU that is used for packet detection, Automatic Gain Control (AGC), frequency offset estimation, synchronization, indication of modulation (SC or OFDM) and channel estimation. The format of the preamble is common to both OFDM packets and SC packets. The preamble is composed of two parts: the Short Training field and the Channel Estimation field.)

2. Embodiment to which the Present Invention is Applicable

As described above, the IEEE 802.11 ay system to which the present invention is applicable may support an SC mode and an OFDM mode.

At this time, timing related parameters of an EDMG OFDM mode may be defined as listed in the following Table.

TABLE 2

| Parameter | Value | | | |
|---|---|---|---|---|
| | $N_{CB} = 1$ | $N_{CB} = 2$ | $N_{CB} = 3$ | $N_{CB} = 4$ |
| $N_{SD}$: Number of data subcarriers | 336 | 734 | 1134 | 1532 |
| $N_{SP}$: Number of pilot subcarriers | 16 | 36 | 56 | 76 |
| $N_{DC}$: Number of DC subcarriers | 3 | 3 | 3 | 3 |
| $N_{ST}$: Total number of subcarriers | 355 | 773 | 1193 | 1611 |
| $N_{SE}$: Number of subcarriers occupying half of the overall bandwidth | 177 | 386 | 596 | 805 |
| $N_{GI\ short}$: short guard interval length | 48 | 96 | 144 | 192 |
| $N_{GI\ normal}$: normal guard interval length | 96 | 192 | 288 | 384 |
| $N_{GI\ long}$: long guard interval length | 192 | 384 | 576 | 768 |
| $\Delta_F$: Subcarrier frequency spacing | 5.15625 MHz | 5.15625 MHz | 5.15625 MHz | 5.15625 MHz |
| $F_z$: EDMG OFDM sample rate | 2.64 GHz | 5.28 GHz | 7.92 GHz | 10.56 GHz |
| $T_s$: EDMG OFDM sample time | 0.38 ns | 0.19 ns | 0.13 ns | 0.09 ns |
| $N_{DFT}$: DFT size | 512 | 1024 | 1536 | 2048 |
| $T_{DFT}$: OFDM IDFT/DFT period | 0.194 μs | 0.194 μs | 0.194 μs | 0.194 μs |
| $T_{GI\ short}$: short guard interval duration | 18.18 ns | 18.18 ns | 18.18 ns | 18.18 ns |
| $T_{GI\ normal}$: normal guard interval duration | 36.36 ns | 36.36 ns | 36.36 ns | 36.36 ns |
| $T_{GI\ long}$: long guard interval duration | 72.72 ns | 72.72 ns | 72.72 ns | 72.72 ns |

Also, the IEEE 802.11ay system to which the present invention is applicable may support hybrid beamforming (analog beamforming+digital beamforming).

To this end, the STA may feed channel information obtained through a sounding procedure during a digital beamforming procedure in an OFDM mode back to the PCP/AP. The feedback information may be transmitted through a Digital BF Feedback element of a MIMO BF Feedback frame.

At this time, considering signaling overhead, etc., the STA may perform grouping for subcarriers instead of feeding back channel information corresponding to all the subcarriers and then perform feedback for channel information corresponding to subcarriers spaced apart from each other on a constant subcarrier spacing basis.

At this time, the STA may transmit a feedback for digital beamforming to the PCP/AP on the basis of the following methods. Hereinafter, the configuration of the present invention will be described in detail based on how many subcarriers being set to one group (e.g., grouping cator $N_g$) is determined and a reference subcarrier for which feedback is performed after grouping factor $N_g$ is determined.

Based on features of a channel model of the 802.11ay system to which the present invention is applicable, 1, 2, 4, 8, 16, or 32 may be applied as a value of a grouping factor $N_g$.

More preferably, the value of the grouping factor $N_g$ may be determined based on a coherence bandwidth and/or link level simulation of a channel model.

First of all, considering a coherent BW and a subcarrier spacing for a Living Room (LR) and Conference Room (CR) channel of which a coherent BW is about 14 MHz and a Enterprise Cubical (e.g., CB) channel of which coherent BW is about 83 MHz, 2 may be applied to a minimum $N_g$ value.

Also, if the result of link level simulation for the $N_g$ value exceeding 2 has no performance degradation, the $N_g$ value may be set to any one of 4, 8, and 16.

However, if the $N_g$ value is an odd number not 1, it may be difficult to maintain a symmetric structure. This is because that the number of subcarriers except DC subcarriers is an even number.

Particularly, the 802.11ay system to which the present invention is applicable may support channel bonding (CB) for a maximum of four channels. Therefore, a detailed description of a subcarrier index related to channel information that may be fed back by the STA from channels (e.g., 1CB, 2CB, 3CB, or 4CB) bonded in accordance with each grouping factor value will be given hereinafter.

2.1. $N_g=1$

In this case, the STA may feed channel information per subcarrier back through all the subcarriers except Direct Current (DC) subcarriers.

(1) In case of 1CB, subcarrier indices to which channel information is fed back

[−177:−2,2:177]

(2) In case of 2CB, subcarrier indices to which channel information is fed back

[−386:−2,2:386]

(3) In case of 3CB, subcarrier indices to which channel information is fed back

[−596:−2,2:596]

(4) In case of 4CB, subcarrier indices to which channel information is fed back

[−805:−2,2:805]

2.2. $N_g=2$ 2.2.1. Case that a Nested Structure of Bonded Channels is Considered In the present invention, the nested structure may mean that subcarrier indices to which channel information is fed back with respect to N+1 CB (in this case, N is a natural number larger than 1) include subcarrier indices, to which channel information is fed back with respect to N CB, as they are. In other words, subcarrier indices to which channel information is fed back in case of N CB may equally be included in subcarrier indices to which channel information is fed back in case of N+1 CB, and additional subcarrier indices to which channel information is fed back in case of N+1 CB may be determined based on subcarrier indices to which channel information is fed back in case of N CB.

The above method may be more favorable for hardware implementation. In this case, as described above, subcarrier indices (for feeding back channel information) of a single channel may be included in subcarrier indices (for feeding back channel information) of 2CB, the subcarrier indices (for feeding back channel information) of 2CB may be included in subcarrier indices (for feeding back channel information) of 3CB, and the subcarrier indices (for feeding back channel information) of 3CB may be included in subcarrier indices (for feeding back channel information) of 4CB. According to this nested structure, the subcarrier indices (for feeding back channel information) of 4CB may include a position of a subcarrier of all channel bonding factors.

According to the present invention, since subcarriers [1,0,1] correspond to DC subcarriers, the corresponding subcarriers may be excluded in determining feedback subcarrier indices. At this time, for channel estimation for the corresponding subcarriers, channel information feedback subcarriers may be grouped from the subcarriers corresponding to subcarrier indices −2 and 2. Since the $N_g$ value is 2, a grouping basis is set to 2, and both edge subcarriers may be included in the channel information feedback subcarriers.

(1) In case of 1CB, subcarrier indices to which channel information is fed back

[−177,−176,−174,−172, . . . ,−8,−6,−4,−2,2,4,6,8, 10, . . . ,172,174,176,177]

That is, the feedback subcarrier indices may be configured as follows.

[−177,−176+2*a (where a=[0:87]),2+2*b (where b=[0: 87]),177] or [477:476:2:176,177]

(2) In case of 2CB, subcarrier indices to which channel information is fed back

[−386,−385,−383,−381,−379,−377,−375, . . . ,−185,−183,−181,−179,−177,−176,−174,−172, . . . ,−8,−6,−4,−2,2,4,6,8,10, . . . ,172,174,176,177,179,181,183,185, . . . ,375,377,381,383,385,3 86]

That is, the feedback subcarrier indices may be configured as follows.

[−386,−385+2*c (where c=[0:103]),−177,−176+2*a (where, a=[0:87]),2+2*b (where b=[0:87]),177,179+2*d (where d=[0:103]),386]

(3) In case of 3CB, subcarrier indices to which channel information is fed back

[−596,−594,−592,−590, . . . ,−394,−392,−390,−388,−386,−385,−383,−381,−379,−377,−375 . . . ,−185,−183,−181,−179,−177,−176,−174,−172, . . . ,−8,−6,−4,−2,2,4,6,8,10, . . . ,172,174,176,177, 179,181,183,185, . . . ,375,377,381,383,385,386,388,390,392,394, . . . ,590,592,594,596]

That is, the feedback subcarrier indices may be configured as follows.

[−596,−594+2*e (where e=[0:103]),−386,−385+2*c (where c=[0:103]),−177,−176+2*a (where a=[0:87]),2+2*b (where 2*b=[0:87]),177,179+2*d (where d=[0:103]),386,388+2*f (where f=[0:103],596]

(4) In case of 4CB, subcarrier indices to which channel information is fed back

[−805,−804,−802,−800, . . . ,−602,−600,−598,−596,−594,−592,−590, . . . ,−394,−392,−39 0,−388,−386,−385,−383,−381,−379,−377,−375, . . . ,−185,−183,−181,−179,−177,−176,−174,−172, . . . ,−8,−6,−4,−2,2,4,6,8, 10, . . . ,172,174,176,177,179,181,183,185, . . . ,375,377,381,383,385,386,388,3 90,392,394, . . . ,590,592,594,596, 598,600,602, . . . ,800,802,804,805]

That is, the feedback subcarrier indices may be configured as follows.

[−805,−804+2*g (where g=[0:103]),−596,−594+2*e (where e=[0:103]),−386,−385+2*c (where c=[0:103]),−177,−176+2*a (where a=[0:87]),2+2*b (where b=[0:87]), 177,179+2*d (where d=[0:103]),386,388+2*f (where f=[0: 103],596,598+2*h (where h=[0:103],805]

2.2.2. Case that a Nested Structure of Bonded Channels is not Considered

In this case, unlike the aforementioned section 2.2.1, feedback subcarrier indices may be configured for each channel bonding factor without using the nested structure. At this time, considering DC subcarriers and edge subcarriers, the feedback subcarriers may be configured as follows.

(1) In case of 1CB, subcarrier indices to which channel information is fed back

[−177,−176,−174,−172, . . . ,−8,−6,−4,−2,2,4,6, 8, . . . ,172,174,176,177]

(2) In case of 2CB, subcarrier indices to which channel information is fed back

[−386,−384,−382,−380, . . . ,−8,−6,−4,−2,2,4,6, 8, . . . ,380,382,384,386]

(3) In case of 3CB, subcarrier indices to which channel information is fed back

[−596,−594,−592,−590, . . . ,−8,−6,−4,−2,2,4,6, 8, . . . ,590,592,594,596]

(4) In case of 4Cb, subcarrier indices to which channel information is fed back

[−805,−804,−802,−800, . . . ,−8,−6,−4,−2,2,4,6, 8, . . . ,800,802,804,805]

2.3. $N_g=4$ 2.3.1. Case that a Nested Structure of Bonded Channels is Considered The above method may be more favorable for hardware implementation. In this case, as described above, subcarrier indices (for feeding back channel information) of a single channel may be included in subcarrier indices (for feeding back channel information) of 2CB, the subcarrier indices (for feeding back channel information) of 2CB may be included in subcarrier indices (for feeding back channel information) of 3CB, and the subcarrier indices (for feeding back channel information) of 3CB may be included in subcarrier indices (for feeding back channel information) of 4CB. According to this nested structure, the subcarrier indices (for feeding back channel information) of 4CB may include a position of a subcarrier of all channel bonding factors.

According to the present invention, since subcarriers [4,0,1] correspond to DC subcarriers, the corresponding subcarriers may be excluded in determining feedback subcarrier indices. At this time, for channel estimation for the corresponding subcarriers, channel information feedback subcarriers may be grouped from the subcarriers corresponding to subcarrier indices −2 and 2.

(1) In case of 1CB, subcarrier indices to which channel information is fed back

[−177,−174,−170,−166,−162,−158,−154,−150,−146,−142,−138,−134,−130,−126,−122,−118,−114,−110,−106,−102,−98,−94,−90,−86,−82,−78,−74,−70,−66,−62,−58,−54,−50,−46,−42,−38,−34, −30,−26,−22,−18,−14,−10,−6,−2,2,6,10,14,18,22,26,30,34,38,42,46,50,54,58,62,66,70,74,78,82,8 6,90,94,98,102,106,110,114,118,122,126,130,134,138,142,146,150,154,158,162,166,170,174, 177]

That is, the feedback subcarrier indices may be configured as follows.

[−177,−174+4*a (where a=[0:43]),2+4*b (where b=[0:43]),177] or [477,−174:4:174,177]

At this time, in case of a single channel, since there are data subcarriers from −177 to 177, the STA cannot use the subcarriers −178 and 178 for channel information feedback. Therefore, among the subcarriers indicated by the feedback subcarrier indices, the subcarriers corresponding to the subcarrier indices −177 and 177 may be spaced apart from the other subcarriers as much as a spacing of 3 subcarriers not 4 subcarriers. Therefore, channel information on the corresponding subcarriers may be subjected to interpolation appropriately.

(2) In case of 2CB, subcarrier indices to which channel information is fed back

[−386,−385,−381,−377,−373,−369,−365,−361,−357,−353,−349,−345,−341,−337,−333,−329,−325,−321,−317,−313,−309,−305,−301,−297,−293,−289,−285,−281,−277,−273,−269,−265,−261,−257,−253,−249,−245,−241,−237,−233,−229,−225,−221,−217,−213,−209,−205,−201,−197,−193,−189,−185,−181,−177,−174,−170,−166,−162,−158,−154,−150,−146,−142,−138,−134,−130,−126,−122,−118,−114,−110,−106,−102,−98,−94,−90,−86,−82,−78,−74,−70,−66,−62,−58,−54,−50,−46,−42,−38,−34,−30,−26,−22,−18,−14,−10,−6,−2,2,6,10,14,18,22,26,30,34,38,42,46,50,54,58,62,66,70,74,78,82,86,90, 94,98,102,106,110,114,118,122,126,130,134,138,142,146,150,154,158,162,166,170,174, 177, 181,185,189,193,197,201,205,209,213,217,221,225,229,233,237,241,245,249,253,257,261,2 65,269,273,277,281,285,289,293,297,301,305,309,313,317,321,325,329, 333,337,341,345,34 9,353,357,361,365,369,373,377,381,385,386]

That is, the feedback subcarrier indices may be configured as follows.

[−386,−385+4*c (where c=[0:51]),−177,−176+4*a (where a=[0:43]),2+4*b (where b=[0:43]),177,181+4*d (where d=[0:51]),386]

That is, the feedback subcarrier indices in case of 2CB include feedback subcarrier indices of a single channel, and additional feedback subcarrier indices may be configured at a spacing of 4 subcarriers based on the subcarriers corresponding to subcarrier indices −177 and 177. In the same manner as the aforementioned case, channel information on subcarriers corresponding to edge carrier indices −386 and 386 may be subjected to interpolation appropriately.

(3) In case of 3CB, subcarrier indices to which channel information is fed back

[−596,−594,−590,−586,−582,−578,−574,−570,−566,−562,−558,−554,−550,−546,−542,−538,−534,−530,−526,−522,−518,−514,−510,−506,−502,−498,−494,−490,−486,−482,−478,−474,−470,−466,−462,−458,−454,−450,−446,−442,−438,−434,−430,−426,−422,−418,−414,−410,−406,−402,−398,−394,−390,−386,−385,−381,−377,−373,−369,−365,−361,−357,−353,−349,−345,−341,−337,−333,−329,−325,−321,−317,−313,−309,−305,−301,−297,−293,−289,−285,−281,−277,−273,−269,−265,−261,−257,−253,−249,−245,−241,−237,−233,−229,−225,−221,−217,−213,−209,−205,−201,−197,−193,−189,−185,−181,−177,−174,−170,−166,−162,−158,−154,−150,−146,−142,−138,−134,−130,−126,−122,−118,−114,−110,−106,−102,−98,−94,−90,−86,−82,−78,−74,−70,−66,−62,−58,−54,−50,−46,−42,−38,−34,−30,−26,−2 2,−18,−14,−10,−6,−2,2,6,10,14,18,22,26,30,34,38,42,46,50,54,58,62,66,70,74,78,82,86,90,94,9 8,102,106,110,114,118,122,126,130,134,138,142,146,150,154,158, 162,166,170,174,177,181, 185,189,193,197,201,205,209, 213,217,221,225,229,233,237,241,245,249,253,257,261, 265,2 69,273,277,281,285,289,293,297,301,305,309,313, 317,321,325,329,333,337,341,345,349,35 3,357,361,365, 369,373,377,381,385,386,390,394,398,402,406,410,414, 418,422,426,430,434, 438,442,446,450,454,458,462,466, 470,474,478,482,486,490,494,498,502,506,510,514,518,5 22,526,530,534,538,542,546,550,554,558,562,566,570,574, 578,582,586,590,594,596]

That is, the feedback subcarrier indices may be configured as follows.

[−596,−594+4*e (where e=[0:51]),−386,−385+4*c (where c=[0:51]),−177,−176+4*a (where a=[0:43]),2+4*b (where 2*b=[0:87]),177,181+4*d (where d=[0:51]),386, 390+4*f (where f=[0:51],596]

That is, the feedback subcarrier indices in case of 3CB include feedback subcarrier indices of 2CB, and additional feedback subcarrier indices may be configured at a spacing of 4 subcarriers based on the subcarriers corresponding to subcarrier indices −386 and 386. In the same manner as the aforementioned case, channel information on subcarriers corresponding to edge carrier indices −596 and 596 may be subjected to interpolation appropriately.

(4) In case of 4CB, subcarrier indices to which channel information is fed back

[−805,−804,−800,−796,−792,−788,−784,−780,−776,−772,−768,−764,−760,−756,−752,−748,−744,−740,−736,−732,−728,−724,−720,−716,−712,−708,−704,−700,−696,−692,−688,−684,−680,−676,−672,−668,−664,−660,−656,−652,−648,−644,−640,−636,−632,−628,−624,−620,−616,−612,−608,−604,−600,−596,−594,−590,−586,−582,−578,−574,−570,−566,−562,−558,−554,−550,−546,−542,−538,−534,−530,−526,−522,−518,−514,−510,−506,−502,−498,−494,−490,−486,−482,−478,−474,−470,−466,−462,−458,−454,−450,−446,−442,−438,−434,−430,−426,−422,−418,−414,−410,−406,−402,−398,−394,−390,−386,−385,−381,−377,−373,−369,−365,−361,−357,−353,−349,−345,−341,−337,−333,−329,−325,−321,−317,−313,−309,−305,−301,−297,−293,−289,−285,−281,−277,−273,−269,−265,−261,−257,−253,−249,−245,−241,−237,−233,−229,−225,−221,−217,−213,−209,−205,−201,−197,−193,−189,−185,−181,−177,−174,−170,−166,−162,−158,−154,−150,−146,−142,−138,−134,−130,−126,−122,−118,−114,−110,−106,−102,−98,−94,−90,−86,−82,−78,−74,−70,−66,−62,−58,−54,−50,−46,−42,−38,−34,−30,−26,−22,−18,−14,−10,−6,−2,2,6,10, 14,18,22,26,30,34,38,42,46,50,54,58,62,66,70,74,78,82,86, 90,94,98,102, 106,110,114,118,122,126,130,134,138,142, 146,150,154,158,162,166,170,174,177,181,185,1 89,193, 197,201,205,209,213,217,221,225,229,233,237,241,245, 249,253,257,261,265,269,27 3,277,281,285,289,293,297, 301,305,309,313,317,321,325,329,333,337,341,345,349, 353,357, 361,365,369,373,377,381,385,386,390,394,398, 402,406,410,414,418,422,426,430,434,438,4 42,446,450, 454,458,462,466,470,474,478,482,486,490,494,498,502, 506,510,514,518,522,52 6,530,534,538,542,546,550,554, 558,562,566,570,574,578,582,586,590,594,596,600,604, 608, 612,616,620,624,628,632,636,640,644,648,652,656, 660,664,668,672,676,680,684,688,692,6 96,700,704,708, 712,716,720,724,728,732,736,740,744,748,752,756,760, 764,768,772,776,78 0,784,788,792,796,800,804,805]

That is, the feedback subcarrier indices may be configured as follows.

[−805,−804+4*g (where g=[0:51]),−596,−594+4*e (where e=[0:51]),−386,−385+4*c (where c=[0:51]),−177,−176+4*a (where a=[0:43]),2+4*b (where 2*b=[0:87]),177, 181+4*d (where d=[0:51]),386,390+4*f (where f=[0:51], 596,600+4*h (where h=[0:51],805]

That is, the feedback subcarrier indices in case of 4CB include feedback subcarrier indices of 3CB, and additional feedback subcarrier indices may be configured at a spacing of 4 subcarriers based on the subcarriers corresponding to subcarrier indices −596 and 596. In the same manner as the aforementioned case, channel information on subcarriers corresponding to edge carrier indices −805 and 805 may be subjected to interpolation appropriately.

2.3.2. Case that a Nested Structure of Bonded Channels is not Considered

In this case, unlike the aforementioned section 2.3.1, feedback subcarrier indices may be configured for each channel bonding factor without using the nested structure. At this time, considering DC subcarriers and edge subcarriers, the feedback subcarriers may be configured as follows.

(1) In case of 1CB, subcarrier indices to which channel information is fed back

[−177,−174,−170,−166, . . . ,−14,−10,−6,−2,2,6,10, 14, . . . ,166,170,174,177]

(2) In case of 2CB, subcarrier indices to which channel information is fed back

[−386,−382,−378,−374, . . . ,−14,−10,−6,−2,2,6,10, 14, . . . ,374,378,382,386]

(3) In case of 3CB, subcarrier indices to which channel information is fed back

[−596,−594,−590,−586, . . . ,−14,−10,−6,−2,2,6,10, 14, . . . ,586,590,594,596]

(4) In case of 4CB, subcarrier indices to which channel information is fed back

[−805,−802,−798,−794, . . . ,−14,−10,−6,−2,2,6,10,14, 794,798,802,805]

2.4. $N_g=8$ 2.4.1. Case that a Nested Structure of Bonded Channels is Considered The above method may be more favorable for hardware implementation. In this case, as described above, subcarrier indices (for feeding back channel information) of a single channel may be included in subcarrier indices (for feeding back channel information) of 2CB, the subcarrier indices (for feeding back channel information) of 2CB may be included in subcarrier indices (for feeding back channel information) of 3CB, and the subcarrier indices (for feeding back channel information) of 3CB may be included in subcarrier indices (for feeding back channel information) of 4CB. According to this nested structure, the subcarrier indices (for feeding back channel information) of 4CB may include a position of a subcarrier of all channel bonding factors.

According to the present invention, since subcarriers [−1,0,1] correspond to DC subcarriers, the corresponding subcarriers may be excluded in determining feedback subcarrier indices. At this time, for channel estimation for the corresponding subcarriers, channel information feedback subcarriers may be grouped from the subcarriers corresponding to subcarrier indices −2 and 2.

(1) In case of 1CB, subcarrier indices to which channel information is fed back

[−177,−170,−162,−154,−146,−138,−130,−122,−114,−106,−98,−90,−82,−74,−66,−58,−50,−42,−34,−26,−18,−10,−2,2,10,18,26,34,42,50,58,66,74,82,90,98,106,114,122,130, 138,146,15 4,162,170,177]

That is, the feedback subcarrier indices may be configured as follows.

[−177,−170+8*a (where a=[0:21]),2+8*b (where b=[0: 21]),177] or [−177,−170:8:170, 177]

At this time, in case of a single channel, since there are data subcarriers from −177 to 177, the STA cannot use the subcarriers −178 and 178 for channel information feedback. Therefore, among the subcarriers indicated by the feedback subcarrier indices, the subcarriers corresponding to the subcarrier indices −177 and 177 may be spaced apart from the other subcarriers as much as a spacing of 7 subcarriers not 8 subcarriers. Therefore, channel information on the corresponding subcarriers may be subjected to interpolation appropriately.

(2) In case of 2CB, subcarrier indices to which channel information is fed back

[−386,−385,−377,−369,−361,−353,−345,−337,−329,−321,−313,−305,−297,−289,−281,−273,−265,−257,−249,−241,−233,−225,−217,−209,−201,−193,−185,−177,−170,−162,−154,−146,−138,−130,−122,−114,−106,−98,−90,−82,−74,−66,−58,−50,−42,−34,−26,−18,−10,−2,2,10,18,26,34,42, 50,5 8,62,70,78,86,94,102,110,118,126,134,142,150,158, 166,174,177,185,193,201,209,217,225,2 33,241,249,257, 265,273,281,289,297,305,313,321,329,337,345,353,361, 369,377,385,386]

That is, the feedback subcarrier indices may be configured as follows.

[−386,−385+8*c (where c=[0:25]),−177,−170+8*a (where a=[0:21]),2+8*b (where b=[0:21]),177,185+8*d (where d=[0:25]),386]

That is, the feedback subcarrier indices in case of 2CB include feedback subcarrier indices of a single channel, and additional feedback subcarrier indices may be configured at a spacing of 8 subcarriers based on the subcarriers corresponding to subcarrier indices −177 and 177. In the same manner as the aforementioned case, channel information on subcarriers corresponding to edge carrier indices −386 and 386 may be subjected to interpolation appropriately.

(3) In case of 3CB, subcarrier indices to which channel information is fed back

[−596,−594,−586,−578,−570,−562,−554,−546,−538,−530,−522,−514,−506,−498,−490,−482,−474,−466,−458,−450,−442,−434,−426,−418,−410,−402,−394,−386,−385,−377,−369,−361,−353,−345,−337,−329,−321,−313,−305,−297,−289,−281,−273,−265,−257,−249,−241,−233,−225,−217,−209,−201,−193,−185,−177,−170,−162,−154,−146,−138,−130,−122,−114,−106,−98,−90,−82,−74,−66,−58,−50,−42,−34,−26,−18,−10,−2,2,10,18,26,34,42,50,58,62,70, 78,86,94,102,110,118,126,134,142,15 0,158,166,174,177, 185,193,201,209,217,225,233,241,249,257,265,273,281, 289,297,305,313, 321,329,337,345,353,361,369,377,385, 386,394,402,410,418,426,434,442,450,458,466,474,4 82,490,498,506,514,522,530,538,546,554,562,570,578,586, 594,596]

That is, the feedback subcarrier indices may be configured as follows.

[−596,−594+8*e (where e=[0:25]),−386,−385+8*c (where c=[0:25]),−177,−170+8*a (where a=[0:21]),2+8*b (where b=[0:21]),177,185+8*d (where d=[0:25]),386,394+ 4*f (where f=[0:51],596]

That is, the feedback subcarrier indices in case of 3CB include feedback subcarrier indices of 2CB, and additional feedback subcarrier indices may be configured at a spacing of 4 subcarriers based on the subcarriers corresponding to subcarrier indices −386 and 386. In the same manner as the aforementioned case, channel information on subcarriers corresponding to edge carrier indices −596 and 596 may be subjected to interpolation appropriately.

(4) In case of 4CB, subcarrier indices to which channel information is fed back

[−805,−804,−796,−788,−780,−772,−764,−756,−748,−740,−732,−724,−716,−708,−700,−692,−684,−676,−668,−660,−652,−644,−636,−628,−620,−612,−604,596,−594,−586,−578,−570,−562, −554,−546,−538,−530,−522,−514,−506,−498,−490,−482,−474,−466,−458,−450,−442,−434,−426,−418, −410,−402,−394,−386,−385,−377,−369,−361,−353,−345,−337,−329,−321,−313,−305,−297,−289,−281, −273,−265,−257,−249,−241,−233,−225,−217,−209,−201,−193,−185,−177,−170,−162,−154,−146,−138, −130,−122,−114,−106,−98,−90,−82,−74,−66,−58,−50,−42,−34,−26,−18,−10,−2,2,10,18,26,34,42,50,5 8,62,70,78,86,94,102,110, 118,126,134,142,150,158,166,174,177,185,193,201,209, 217,225,2 33,241,249,257,265,273,281,289,297,305,313, 321,329,337,345,353,361,369,377,385,386,39 4,402,410, 418,426,434,442,450,458,466,474,482,490,498,506,514, 522,530,538,546,554,562, 570,578,586,594,596,604,612, 620,628,636,644,652,660,668,676,684,692,700,708,716, 724,7 32,740,748,756,764,772,780,788,796,804,805]

That is, the feedback subcarrier indices may be configured as follows.

[−805,−804+8*g (where g=[0:25]),−596,−594+8*e (where e=[0:25]),−386,−385+8*c (where c=[0:25]),−177,−170+8*a (where a=[0:21]),2+8*b (where b=[0:21]),177, 185+8*d (where d=[0:25]),386,394+8*f (where f=[0:51], 596,604+8*h (where h=[0:25],805]

That is, the feedback subcarrier indices in case of 4CB include feedback subcarrier indices of 3CB, and additional feedback subcarrier indices may be configured at a spacing of 8 subcarriers based on the subcarriers corresponding to subcarrier indices −596 and 596. In the same manner as the aforementioned case, channel information on subcarriers corresponding to edge carrier indices −805 and 805 may be subjected to interpolation appropriately.

2.4.2. Case that a Nested Structure of Bonded Channels is not Considered

In this case, unlike the aforementioned section 2.4.1, feedback subcarrier indices may be configured for each channel bonding factor without using the nested structure. At this time, considering DC subcarriers and edge subcarriers, the feedback subcarriers may be configured as follows.

(1) In case of 1CB, subcarrier indices to which channel information is fed back

[−177,−170,−162,−154, . . . ,−26,−18,−10,−2,2,10,18,26, 154,162,170,177]

(2) In case of 2CB, subcarrier indices to which channel information is fed back

[−386,−378,−370,−362, . . . ,−26,−18,−10,−2,2,10,18, 26, . . . ,362,370,378, 386]

(3) In case of 3CB, subcarrier indices to which channel information is fed back

[−596,−594,−586,−578, . . . ,−26,−18,−10,−2,2,10,18,26, 578,586,594,596]

(4) In case of 4CB, subcarrier indices to which channel information is fed back

[−805,−802,−794,−786, . . . ,−26,−18,−10,−2,2,10,18,26, 786,794,802,805]

2.5. $N_g=16$ 2.5.1. Case that a Nested Structure of Bonded Channels is Considered The above method may be more favorable for hardware implementation. In this case, as described above, subcarrier indices (for feeding back channel information) of a single channel may be included in subcarrier indices (for feeding back channel information) of 2CB, the subcarrier indices (for feeding back channel information) of 2CB may be included in subcarrier indices (for feeding back channel information) of 3CB, and the subcarrier indices (for feeding back channel information) of 3CB may be included in subcarrier indices (for feeding back channel information) of 4CB. According to this nested structure, the subcarrier indices (for feeding back channel information) of 4CB may include a position of a subcarrier of all channel bonding factors.

According to the present invention, since subcarriers [−1,0,1] correspond to DC subcarriers, the corresponding subcarriers may be excluded in determining feedback subcarrier indices. At this time, for channel estimation for the corresponding subcarriers, channel information feedback subcarriers may be grouped from the subcarriers corresponding to subcarrier indices −2 and 2.

(1) In case of 1CB, subcarrier indices to which channel information is fed back

[−177,−162,−146,−130, . . . ,−50,−34,−18,−2,2,18,34, 50, . . . ,130,146,162,177]

At this time, in case of a single channel, since there are data subcarriers from −177 to 177, the STA cannot use the subcarriers −178 and 178 for channel information feedback. Therefore, among the subcarriers indicated by the feedback subcarrier indices, the subcarriers corresponding to the subcarrier indices −177 and 177 may be spaced apart from the other subcarriers as much as a spacing of 15 subcarriers not 16 subcarriers. Therefore, channel information on the corresponding subcarriers may be subjected to interpolation appropriately.

(2) In case of 2CB, subcarrier indices to which channel information is fed back

[−386,−385,−369,−353, . . . ,−241,−225,−209,−193,−177,−162,−146,−130, . . . ,−50,−34,−18,−2,2,18,34, 50, . . . ,130, 146,62,177,193−209,225, . . . ,353,369,385, 386]

That is, the feedback subcarrier indices in case of 2CB include feedback subcarrier indices of a single channel, and additional feedback subcarrier indices may be configured at a spacing of 16 subcarriers based on the subcarriers corresponding to subcarrier indices −177 and 177. In the same manner as the aforementioned case, channel information on subcarriers corresponding to edge carrier indices −386 and 386 may be subjected to interpolation appropriately.

(3) In case of 3CB, subcarrier indices to which channel information is fed back

[−596,−594,−578,−562, . . . ,−450,−434,−418,−402,−386,−385,−369,−353, . . . ,−241,−22 5,−209,−193,−177,−162,−146,−130,−50,−34,−18,−2,2,18,34,50, . . . ,130,146, 162,177,193−209,225, . . . ,353,369,385,386,402,418,434, 450, . . . ,562,578,594,596]

That is, the feedback subcarrier indices in case of 3CB include feedback subcarrier indices of 2CB, and additional feedback subcarrier indices may be configured at a spacing of 16 subcarriers based on the subcarriers corresponding to subcarrier indices −386 and 386. In the same manner as the aforementioned case, channel information on subcarriers corresponding to edge carrier indices −596 and 596 may be subjected to interpolation appropriately.

(4) In case of 4CB, subcarrier indices to which channel information is fed back

[−805,−804,−788,−772, . . . ,−660,−644,−628,−612,−596,−594,−578,−562, . . . ,−450,−43 4,−418,−402,−386,−385,−369,−353, . . . ,−241,−225,−209,−193,−177,−162,−146,−130,−50,−34,−18,−2,2, 18,34,50, . . . ,130,146,162, 177,193−209,225, . . . ,353,369,385,86, 402,418,434, 450, . . . ,562,578, 594,596,612,628,644,660, . . . ,772,788, 804,805]

That is, the feedback subcarrier indices in case of 4CB include feedback subcarrier indices of 3CB, and additional feedback subcarrier indices may be configured at a spacing of 16 subcarriers based on the subcarriers corresponding to subcarrier indices −596 and 596. In the same manner as the aforementioned case, channel information on subcarriers corresponding to edge carrier indices −805 and 805 may be subjected to interpolation appropriately.

2.5.2. Case that a Nested Structure of Bonded Channels is not Considered

In this case, unlike the aforementioned section 2.5.1, feedback subcarrier indices may be configured for each channel bonding factor without using the nested structure. At this time, considering DC subcarriers and edge subcarriers, the feedback subcarriers may be configured as follows.

(1) In case of 1CB, subcarrier indices to which channel information is fed back

[−177, −162, −146, −130, . . . , −50, −34, −18, −2, 2, 18, 34, 50, . . . , 130, 146, 162, 177]

(2) In case of 2CB, subcarrier indices to which channel information is fed back

[−386, −370, −354, −338, . . . , −50, −34, −18, −2, 2, 18, 34, 50, 338, 354, 370, 386]

(3) In case of 3CB, subcarrier indices to which channel information is fed back

[−596,−594,−578,−562, . . . ,−50,−34,−18,−2,2,18,34, 50, . . . ,562,578,594, 596]

(4) In case of 4CB, subcarrier indices to which channel information is fed back

[−805,−802,−786,−770, . . . ,−50,−34,−18,−2,2,18,34, 50, . . . ,770,786,802, 805]

2.6. $N_g=32$ 2.6.1. Case that a Nested Structure of Bonded Channels is Considered The above method may be more favorable for hardware implementation. In this case, as described above, subcarrier indices (for feeding back channel information) of a single channel may be included in subcarrier indices (for feeding back channel information) of 2CB, the subcarrier indices (for feeding back channel information) of 2CB may be included in subcarrier indices (for feeding back channel information) of 3CB, and the subcarrier indices (for feeding back channel information) of 3CB may be included in subcarrier indices (for feeding back channel information) of 4CB. According to this nested structure, the subcarrier indices (for feeding back channel information) of 4CB may include a position of a subcarrier of all channel bonding factors.

According to the present invention, since subcarriers [−1,0,1] correspond to DC subcarriers, the corresponding subcarriers may be excluded in determining feedback subcarrier indices. At this time, for channel estimation for the corresponding subcarriers, channel information feedback subcarriers may be grouped from the subcarriers corresponding to subcarrier indices −2 and 2.

(1) In case of 1CB, subcarrier indices to which channel information is fed back

[−177,−162,−130,−98,−66,−34,−2,2,18,34,66,98,130, 162,177]

At this time, in case of a single channel, since there are data subcarriers from −177 to 177, the STA cannot use the subcarriers −178 and 178 for channel information feedback. Therefore, among the subcarriers indicated by the feedback subcarrier indices, the subcarriers corresponding to the subcarrier indices −177 and 177 may be spaced apart from the other subcarriers as much as a spacing of 15 subcarriers not 32 subcarriers. Therefore, channel information on the corresponding subcarriers may be subjected to interpolation appropriately.

(2) In case of 2CB, subcarrier indices to which channel information is fed back

[−386,−369,−337,−305,−273,−241,−209,−177,−162,−130,−98,−66,−34,−2,2,18,34,66, 98,130,162,177,209,241, 273,305,337,369,386]

That is, the feedback subcarrier indices in case of 2CB include feedback subcarrier indices of a single channel, and additional feedback subcarrier indices may be configured at a spacing of 32 subcarriers based on the subcarriers corresponding to subcarrier indices −177 and 177. In the same manner as the aforementioned case, channel information on subcarriers corresponding to edge carrier indices −386 and 386 may be subjected to interpolation appropriately.

(3) In case of 3CB, subcarrier indices to which channel information is fed back

[−596,−578,−546,−514,−482,−450,−418,−386,−369,−337,−305,−273,−241,−209,−177,−162,−130,−98,−66,−34,−2,2,18,34,66,98,130,162,177,209,241,273,305,337,369,386, 418,450,4 82,514,546, 578,596]

That is, the feedback subcarrier indices in case of 3CB include feedback subcarrier indices of 2CB, and additional feedback subcarrier indices may be configured at a spacing of 32 subcarriers based on the subcarriers corresponding to subcarrier indices −386 and 386. In the same manner as the aforementioned case, channel information on subcarriers corresponding to edge carrier indices −596 and 596 may be subjected to interpolation appropriately.

(4) In case of 4CB, subcarrier indices to which channel information is fed back

[−805,−788,−756,−724,−692,−660,−628,−596,−578,−546,−514,−482,−450,−418,−386,−369,−337,−305,−273,−241,−209,−177,−162,−130,−98,−66,−34,−2,2,18,34,66,98, 130,162,177,209, 241,273,305,337,369,386,418,450,482, 514,546,578,596,628,660,692,724,756,788,805]

That is, the feedback subcarrier indices in case of 4CB include feedback subcarrier indices of 3CB, and additional feedback subcarrier indices may be configured at a spacing of 32 subcarriers based on the subcarriers corresponding to subcarrier indices −596 and 596. In the same manner as the aforementioned case, channel information on subcarriers corresponding to edge carrier indices −805 and 805 may be subjected to interpolation appropriately.

2.6.2. Case that a Nested Structure of Bonded Channels is not Considered

In this case, unlike the aforementioned section 2.6.1, feedback subcarrier indices may be configured for each channel bonding factor without using the nested structure. At this time, considering DC subcarriers and edge subcarriers, the feedback subcarriers may be configured as follows.

(1) In case of 1CB, subcarrier indices to which channel information is fed back

[−177,−162,−130,−98,−66,−34,−2,2,34,66,98,130,162, 177]

(2) In case of 2CB, subcarrier indices to which channel information is fed back

[−386,−354,−322,−290, . . . ,−98,−66,−34,−2,2,34, 66,98, . . . ,290,322,354, 386]

(3) In case of 3CB, subcarrier indices to which channel information is fed back

[−596,−578,−546,−514, . . . ,−98,−66,−34,−2,2,34,66, 98, . . . ,514,546,578,596]

(4) In case of 4CB, subcarrier indices to which channel information is fed back

[−805,−802,−770,−738, . . . ,−98,−66,−34,−2,2,34,66, 98 . . . ,738,770,802, 805]

2.7. Subconclusion

Figure 11:
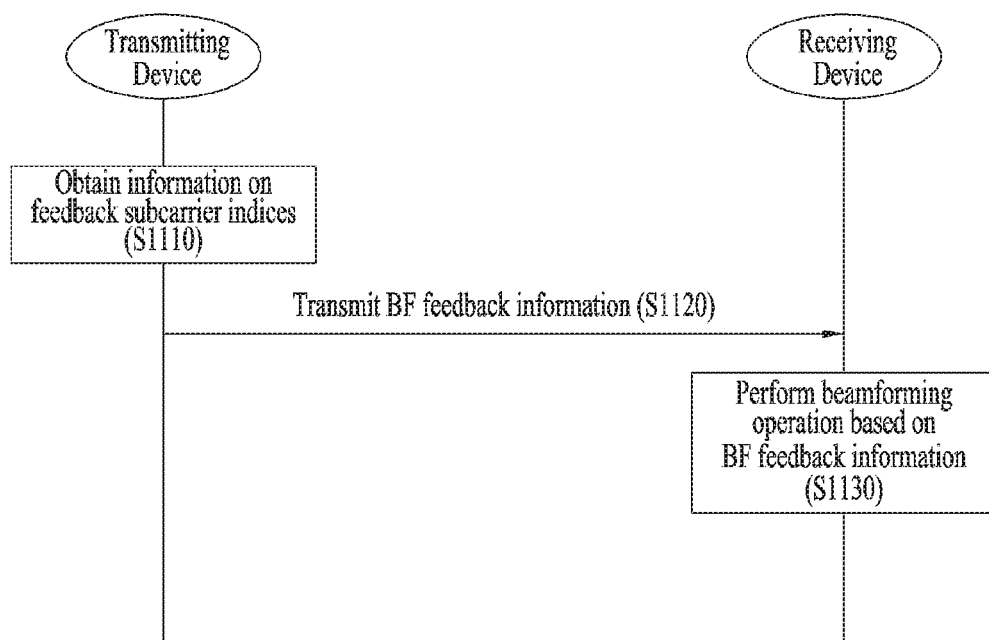
FIG. 11 is a diagram simply illustrating an operation of each of a transmitting device and a reception device according to one embodiment of the present invention.
Figure 12:
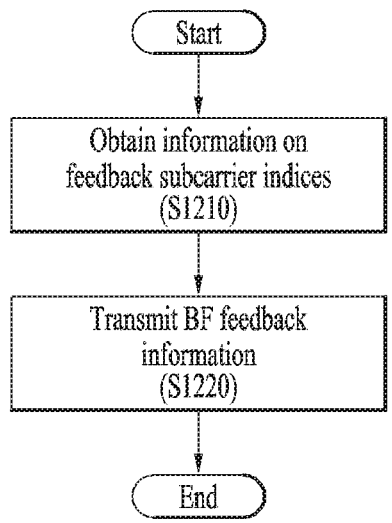
FIG. 12 is a flow chart simply illustrating an operation of a transmitting device according to one embodiment of the present invention.
Figure 13:
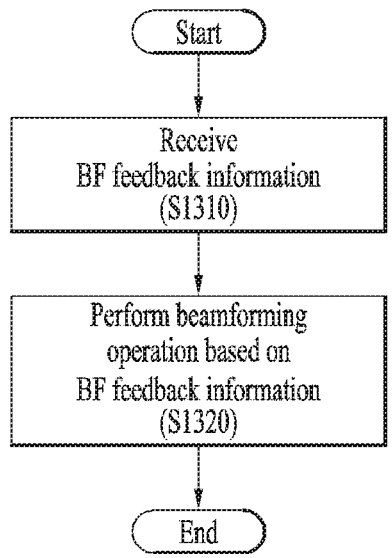
FIG. 13 is a flow chart simply illustrating an operation of a receiving device according to one embodiment of the present invention.

FIG. 11 is a diagram simply illustrating an operation of each of a transmitting device and a reception device according to one embodiment of the present invention, FIG. 12 is a flow chart simply illustrating an operation of a transmitting device according to one embodiment of the present invention, and FIG. 13 is a flow chart simply illustrating an operation of a receiving device according to one embodiment of the present invention.

As described in FIGS. 11, 12 and 13, the transmitting device (maybe STA) obtaining information on feedback subcarrier indices for the beamforming feedback information, based on an $N_g$ value of subcarrier groupings and a number $N_{CB}$ of bonded channel. [S1110 and S1210]. Herein, $N_{CB}$ may be one of 1, 2, 3 and/or 4.

The transmitting device transmits the beamforming feedback information comprising channel information related to the feedback subcarrier indices [S1120 and S1220].

Accordingly, the receiving device (maybe PCP/AP) receives the beamforming feedback information comprising channel information related to the feedback subcarrier indices from the transmitting device [S1310]. And, the receiving device may perform beamforming operation based on the beamforming feedback information (e.g., determining digital beamforming steering matrices, selecting proper TX/RX beam for the transmitting device, etc) [S1130 and S1320].

In the present invention, the feedback subcarrier indices are determined like below.

When $N_{CB}$ is equal to 1, the feedback subcarrier indices based on $N_g$ comprises:

A subcarrier index −177

First subcarrier indices having the distance equal to multiple of $N_g$ from a subcarrier index −2 between the subcarrier index −177 and the subcarrier index −2

The subcarrier index −2

A subcarrier index 2

Second subcarrier indices having the distance equal to multiple of $N_g$ from the subcarrier index 2 between the subcarrier index 2 and the subcarrier index 177

A subcarrier index 177

And, as disclosed above, the feedback subcarrier indices based on $N_g$ may have a nested structure. That is, when $N_{CB}$ is equal to N+1 (where, N is equal to or larger than 1), the feedback subcarrier based on $N_g$ indices comprises:

First feedback subcarrier indices based on $N_g$ in case that $N_{CB}$ is equal to N. Herein, the first feedback subcarrier indices based on $N_g$ comprises edge subcarrier indices based on $N_g$ in case that $N_{CB}$ is equal to N. The edge subcarrier indices based on $N_g$ in case that $N_{CB}$ is equal to N comprise a first edge subcarrier index and a second edge subcarrier index, and the first edge subcarrier index is smaller than the second edge subcarrier index.

Edge subcarrier indices based on $N_g$ in case that $N_{CB}$ is equal to N+1. Herein, the edge subcarrier indices based on $N_g$ in case that $N_{CB}$ is equal to N+1 comprises a third edge subcarrier index and a fourth edge subcarrier index, and the third edge subcarrier index is smaller than the fourth edge subcarrier index.

Third subcarrier indices having a distance equal to multiple of $N_g$ from the first edge subcarrier index between the first edge subcarrier index and the third edge subcarrier index Fourth subcarrier indices having the distance equal to multiple of $N_g$ from the second edge subcarrier index between the second edge subcarrier index and the fourth edge subcarrier index In the present invention, a value of $N_g$ is one of 2, 4 and/or 8.

In the first example of the present invention, edge subcarrier indices based on $N_g$ in case that $N_{CB}$ is equal to 2 may be subcarrier indices −386 and 386.

In the second example of the present invention, edge subcarrier indices based on $N_g$ in case that $N_{CB}$ is equal to 3 are subcarrier indices −596 and 596.

In the third example of the present invention, edge subcarrier indices based on $N_g$ in case that $N_{CB}$ is equal to 4 are subcarrier indices −805 and 805.

Specifically, when $N_g$ is 2 and $N_{CB}$ is 1, the feedback subcarrier indices may be configured like below:

[−177,−176,−174,−172,−170,−168,−166,−164,−162,− 160,−158,−156,−154,−152,−150,−148,−146,−144,−142,− 140,−138,−136,−134,−132,−130,−128,−126,−124,−122,− 120,−118,−116,−114,−112,−110,−108,−106,−104,−102,− 100,−98,−96,−94,−92,−90,−88,−86,−84,−82,−80,−78,−76,− 74,−72,−70,−68,−66,−64,−62,−60,−58,−56,−54,−52,−50,− 48,−46,−44,−42,−40,−38,−36,−34,−32,−30,−28,−26,−24,− 22,−20,−18,−16,−14,−12,−10,−8,−6,−4,−2,2,4,6,8,10,12,14, 16,18,20,22,24,26,28,30,32,34,36,38, 40,42,44,46,48,50,52, 54,56,58,60,62,64,66,68,70,72,74,76,78,80,82,84,86,88,90, 92,94,96,98, 100,102,104,106,108,110,112,114,116,118, 120,122,124,126,128,130,132,134,136,138,140,14 2,144, 146,148,150,152,154,156,158,160,162,164,166,168,170, 172,174,176,177].

Specifically, when $N_g$ is 4 and $N_{CB}$ is 1, the feedback subcarrier indices may be configured like below:

[−177,−174,−170,−166,−162,−158,−154,−150,−146,− 142,−138,−134,−130,−126,−122,−118,−114,−110,−106,− 102,−98,−94,−90,−86,−82,−78,−74,−70,−66,−62,−58,−54,− 50,−46,−42,−38,−34, −30,−26,−22,−18,−14,−10,−6,−2,2,6, 10,14,18,22,26,30,34,38,42,46,50,54,58,62,66,70,74,78, 82,8 6,90,94,98,102,106,110,114,118,122,126,130,134,138, 142,146,150,154,158,162,166,170,174, 177].

Specifically, when $N_g$ is 8 and $N_{CB}$ is 1, the feedback subcarrier indices may be configured like below:

[−177,−170,−162,−154,−146,−138,−130,−122,−114,− 106,−98,−90,−82,−74,−66,−58,−50,−42,−34,−26,−18,−10,− 2,2,10,18,26,34,42,50,58,66,74,82,90,98,106,114,122,130, 138,146,15 4,162,170,177].

Specifically, when $N_g$ is 2 and $N_{CB}$ is 2, the feedback subcarrier indices may be configured like below:

[−386,−385,−383,−381,−379,−377,−375,−373,−371,− 369,−367,−365,−363,−361,−359,−357,−355,−353,−351,− 349,−347,−345,−343,−341,−339,−337,−335,−333,−331,− 329,−327,−325,−323,−321,−319,−317,−315,−313,−311,− 309,−307,−305,−303,−301,−299,−297,−295,−293,−291,− 289,−287,−285,−283,−281,−279,−277,−275,−273,−271,− 269,−267,−265,−263,−261,−259,−257,−255,−253,−251,− 249,−247,−245,−243,−241,−239,−237,−235,−233,−231,− 229,−227,−225,−223,−221,−219,−217,−215,−213,−211,− 209,−207,−205,−203,−201,−199,−197,−195,−193,−191,− 189,−187,−185,−183,−181,−179,−177,−176,−174,−172,− 170,−168,−166,−164,−162,−160,−158,−156,−154,−152,−

150,-148,-146,-144,-142,-140,-138,-136,-134,-132,-130,-128,-126,-124,-122,-120,-118,-116,-114,-112,-110,-108,-106,-104,-102,-100,-98,-96,-94,-92,-90,-88,-86,-84,-82,-80,-78,-76,-74,-72,-70,-68,-66,-64,-62,-60,-58,-56,-54,-52,-50,-48,-46,-44,-42,-40,-38,-36,-34,-32,-30,-28,-26,-24,-22,-20,-18,-16,-14,-12,-10,-8,-6,-4,-2,2,4,6,8,10,12,14,16,18,20,22,24,26,28,30,32,34,36,38,40,42,44,46,48, 50,52,54,56,58,60,62,64,66,68,70,72,74,76,78,80,82,84,86,88,90,92,94,96,98,100,102,104, 106,108,110,112,114,116,118,120,122,124,126,128,130, 132,134,136,138,140,142,144,146,148, 150,152,154,156, 158,160,162,164,166,168,170,172,174,176,177,179,181, 183,185,187,189,1 91,193,195,197,199,201,203,205,207, 209,211,213,215,217,219,221,223,225,227,229,231,23 3,235,237,239,241,243,245,247,249,251,253,255,257,259, 261,263,265,267,269,271,273,275, 277,279,281,283,285, 287,289,291,293,295,297,299,301,303,305,307,309,311, 313,315,317,3 19,321,323,325,327,329,331,333,335,337, 339,341,343,345,347,349,351,353,355,357,359,36 1,363, 365,367,369,371,373,375,377,379,381,383,385,386].

Specifically, when $N_g$ is 4 and $N_{CB}$ is 2, the feedback subcarrier indices may be configured like below:

[−386,−385,−381,−377,−373,−369,−365,−361,−357,−353,−349,−345,−341,−337,−333,−329,−325,−321,−317,−313,−309,−305,−301,−297,−293,−289,−285,−281,−277,−273,−269,−265,−261,−257,−253,−249,−245,−241,−237,−233,−229,−225,−221,−217,−213,−209,−205,−201,−197,−193,−189,−185,−181,−177,−174,−170,−166,−162,−158,−154,−150,−146,−142,−138,−134,−130,−126,−122,−118,−114,−110,−106,−102,−98,−94,−90,−86,−82,−78,−74,−70,−66,−62,−58,−54,−50,−46,−42,−38,−34,−30,−26,−22,−18,−14,−10,−6,−2,2,6,10,14,18,22,26,30,34,38,42,46,50,54,58, 62,66,70,74,78,82,86,90, 94,98,102,106,110,114,118,122, 126,130,134,138,142,146,150,154,158,162,166,170,174, 177, 181,185,189,193,197,201,205,209,213,217,221,225, 229,233,237,241,245,249,253,257,261,2 65,269,273,277, 281,285,289,293,297,301,305,309,313,317,321,325,329, 333,337,341,345,34 9,353,357,361,365,369,373,377,381, 385,386].

Specifically, when $N_g$ is 8 and $N_{CB}$ is 2, the feedback subcarrier indices may be configured like below:

[−386,−385,−377,−369,−361,−353,−345,−337,−329,−321,−313,−305,−297,−289,−281,−273,−265,−257,−249,−241,−233,−225,−217,−209,−201,−193,−185,−177,−170,−162,−154,−146,−138,−130,−122,−114,−106,−98,−90,−82,−74,−66,−58,−50,−42,−34,−26,−18,−10,−2,2,10,18,26,34,42,50,5 8,62,70,78,86,94,102,110,118,126,134,142,150,158, 166,174,177,185,193,201,209,217,225,2 33,241,249,257, 265,273,281,289,297,305,313,321,329,337,345,353,361, 369,377,385,386].

Specifically, when $N_g$ is 2 and $N_{CB}$ is 3 the feedback subcarrier indices may be configured like below:

[−596,−594,−592,−590,−588,−586,−584,−582,−580,−578,−576,−574,−572,−570,−568,−566,−564,−562,−560,−558,−556,−554,−552,−550,−548,−546,−544,−542,−540,−538,−536,−534,−532,−530,−528,−526,−524,−522,−520,−518,−516,−514,−512,−510,−508,−506,−504,−502,−500,−498,−496,−494,−492,−490,−488,−486,−484,−482,−480,−478,−476,−474,−472,−470,−468,−466,−464,−462,−460,−458,−456,−454,−452,−450,−448,−446,−444,−442,−440,−438,−436,−434,−432,−430,−428,−426,−424,−422,−420,−418,−416,−414,−412,−410,−408,−406,−404,−402,−400,−398,−396,−394,−392,−390,−388,−386,−385,−383,−381,−379,−377,−375,−373,−371,−369,−367,−365,−363,−361,−359,−357,−355,−353,−351,−349,−347,−345,−343,−341,−339,−337,−335,−333,−331,−329,−327,−325,−323,−321,−319,−317,−315,−313,−311,−309,−307,−305,−303,−301,−299,−297,−295,−293,−291,−289,−287,−285,−283,−281,−279,−277,−275,−273,−271,−269,−267,−265,−263,−261,−259,−257,−255,−253,−251,−249,−247,−245,−243,−241,−239,−237,−235,−233,−231,−229,−227,−225,−223,−221,−219,−217,−215,−213,−211,−209,−207,−205,−203,−201,−199,−197,−195,−193,−191,−189,−187,−185,−183,−181,−179,−177,−176,−174,−172,−170,−168,−166,−164,−162,−160,−158,−156,−154,−152,−150,−148,−146,−144,−142,−140,−138,−136,−134,−132,−130,−128,−126,−124,−122,−120,−118,−116,−114,−112,−110,−108,−106,−104,−102, −100,−98,−96,−94,−92,−90,−88,−86,−84,−82,−80,−78,−76,−74,−72,−70,−68,−66,−64,−62,−60,−58,−56,−54,−52,−50,−48,−46,−44,−42,−40,−38,−36,−34,−32,−30,−28,−26,−24,−22,−20,−18,−16,−14,−12,−10,−8,−6,−4,−2,2,4,6,8,10, 12,14,16,18,20,22,24,26,28,30,32,34,36,38,40,42,44,46,48, 50,52,54,56,58, 60,62,64,66,68,70,72,74,76,78,80,82,84,86, 88,90,92,94,96,98,100,102,104,106,108,110,112, 114,116, 118,120,122,124,126,128,130,132,134,136,138,140,142, 144,146,148,150,152,154,1 56,158,160,162,164,166,168, 170,172,174,176,177,179,181,183,185,187,189,191,193, 195,19 7,199,201,203,205,207,209,211,213,215,217,219, 221,223,225,227,229,231,233,235,237,239, 241,243,245, 247,249,251,253,255,257,259,261,263,265,267,269,271, 273,275,277,279,281,2 83,285,287,289,291,293,295,297, 299,301,303,305,307,309,311,313,315,317,319,321,323,32 5,327,329,331,333,335,337,339,341,343,345,347,349,351, 353,355,357,359,361,363,365,367, 369,371,373,375,377, 379,381,383,385,386,388,390,392,394,396,398,400,402, 404,406,408,4 10,412,414,416,418,420,422,424,426,428, 430,432,434,436,438,440,442,444,446,448,450,45 2,454, 456,458,460,462,464,466,468,470,472,474,476,478,480, 482,484,486,488,490,492,494, 496,498,500,502,504,506, 508,510,512,514,516,518,520,522,524,526,528,530,532, 534,536,5 38,540,542,544,546,548,550,552,554,556,558, 560,562,564,566,568,570,572,574,576,578,58 0,582,584, 586,588,590,592,594,596].

Specifically, when $N_g$ is 4 and $N_{CB}$ is 3 the feedback subcarrier indices may be configured like below:

[−596,−594,−590,−586,−582,−578,−574,−570,−566,−562,−558,−554,−550,−546,−542,−538,−534,−530,−526,−522,−518,−514,−510,−506,−502,−498,−494,−490,−486,−482,−478,−474,−470,−466,−462,−458,−454,−450,−446,−442,−438,−434,−430,−426,−422,−418,−414,−410,−406,−402,−398,−394,−390,−386,−385,−381,−377,−373,−369,−365,−361,−357,−353,−349,−345,−341,−337,−333,−329,−325,−321,−317,−313,−309,−305,−301,−297,−293,−289,−285,−281,−277,−273,−269,−265,−261,−257,−253,−249,−245,−241,−237,−233,−229,−225,−221,−217,−213,−209,−205,−201,−197,−193,−189,−185,−181,−177,−174,−170,−166,−162,−158,−154,−150,−146,−142,−138,−134,−130,−126,−122,−118,−114,−110,−106,−102,−98,−94,−90,−86,−82,−78,−74,−70,−66,−62,−58,−54,−50,−46,−42,−38,−34,−30,−26,−2 2,−18,−14,−10,−6,−2,2,6,10,14,18,22,26,30,34, 38,42,46,50,54,58,62,66,70,74,78,82,86,90,94,9 8,102,106, 110,114,118,122,126,130,134,138,142,146,150,154,158, 162,166,170,174,177,181, 185,189,193,197,201,205,209, 213,217,221,225,229,233,237,241,245,249,253,257,261, 265,2 69,273,277,281,285,289,293,297,301,305,309,313, 317,321,325,329,333,337,341,345,349,35 3,357,361,365, 369,373,377,381,385,386,390,394,398,402,406,410,414, 418,422,426,430,434, 438,442,446,450,454,458,462,466, 470,474,478,482,486,490,494,498,502,506,510,514,518,5 22,526,530,534,538,542,546,550,554,558,562,566,570,574, 578,582,586,590,594,596].

Specifically, when $N_g$ is 8 and $N_{CB}$ is 3, the feedback subcarrier indices may be configured like below:

[−596,−594,−586,−578,−570,−562,−554,−546,−538,−530,−522,−514,−506,−498,−490,−482,−474,−466,−458,−450,−442,−434,−426,−418,−410,−402,−394,−386,−385,−377,−369,−361,−353,−345,−337,−329,−321,−313,−305,−297,−289,−281,−273,−265,−257,−249,−241,−233,−225,−217,−209,−201,−193,−185,−177,−170,−162,−154,−146,−138,−130,−122,−114,−106,−98,−90,−82,−74,−66,−58,−50,−42,−34,−26,−18,−10,−2,2,10,18,26,34,42,50,58,62,70,78,86,94,102,110,118,126,134,142,15 0,158,166,174,177,185,193,201,209,217,225,233,241,249,257,265,273,281,289,297,305,313, 321,329,337,345,353,361,369,377,385,386,394,402,410,418,426,434,442,450,458,466,474,4 82,490,498,506,514,522,530,538,546,554,562,570,578,586,594,596].

Specifically, when $N_g$ is 2 and $N_{CB}$ is 4, the feedback subcarrier indices may be configured like below:

[−805,−804,−802,−800,−798,−796,−794,−792,−790,−788,−786,−784,−782,−780,−778,−776,−774,−772,−770,−768,−766,−764,−762,−760,−758,−756,−754,−752,−750,−748,−746,−744,−742,−740,−738,−736,−734,−732,−730,−728,−726,−724,−722,−720,−718,−716,−714,−712,−710,−708,−706,−704,−702,−700,−698,−696,−694,−692,−690,−688,−686,−684,−682,−680,−678,−676,−674,−672,−670,−668,−666,−664,−662,−660,−658,−656,−654,−652,−650,−648,−646,−644,−642,−640,−638,−636,−634,−632,−630,−628,−626,−624,−622,−620,−618,−616,−614,−612,−610,−608,−606,−604,−602,−600,−598,−596,−594,−592,−590,−588,−586,−584,−582,−580,−578,−576,−574,−572,−570,−568,−566,−564,−562,−560,−558,−556,−554,−552,−550,−548,−546,−544,−542,−540,−538,−536,−534,−532,−530,−528,−526,−524,−522,−520,−518,−516,−514,−512,−510,−508,−506,−504,−502,−500,−498,−496,−494,−492,−490,−488,−486,−484,−482,−480,−478,−476,−474,−472,−470,−468,−466,−464,−462,−460,−458,−456,−454,−452,−450,−448,−446,−444,−442,−440,−438,−436,−434,−432,−430,−428,−426,−424,−422,−420,−418,−416,−414,−412,−410,−408,−406,−404,−402,−400,−398,−396,−394,−392,−390,−388,−386,−385,−383,−381,−379,−377,−375,−373,−371,−369,−367,−365,−363,−361,−359,−357,−355,−353,−351,−349,−347,−345,−343,−341,−339,−337,−335,−333,−331,−329,−327,−325,−323,−321,−319,−317,−315,−313,−311,−309,−307,−305,−303,−301,−299,−297,−295,−293,−291,−289,−287,−285,−283,−281,−279,−277,−275,−273,−271,−269,−267,−265,−263,−261,−259,−257,−255,−253,−251,−249,−247,−245,−243,−241,−239,−237,−235,−233,−231,−229,−227,−225,−223,−221,−219,−217,−215,−213,−211,−209,−207,−205,−203,−201,−199,−197,−195,−193,−191,−189,−187,−185,−183,−181,−179,−177,−176,−174,−172,−170,−168,−166,−164,−162,−160,−158,−156,−154,−152,−150,−148,−146,−144,−142,−140,−138,−136,−134,−132,−130,−128,−126,−124,−122,−120,−118,−116,−114,−112,−110,−108,−106,−104,−102,−100,−98,−96,−9 4,−92,−90,−88,−86,−84,−82,−80,−78,−76,−74,−72,−70,−68,−66,−64,−62,−60,−58,−56,−54,−52,−50,−48,−46,−44,−42,−40,−38,−36,−34,−32,−30,−28,−26,−24,−22,−20,−18,−16,−14,−12,−10,−8,−6,−4,−2,2,4,6,8,1 0,12,14,16,18,20,22,24,26,28,30,32,34,36,38,40,42,44,46,48,50,52,54,56,58,60,62,64,66,68,7 0,72,74,76,78,80,82,84,86,88,90,92,94,96,98,100,102,104,106,108,110,112,114,116,118,120, 122,124,126,128,130,132,134,136,138,140,142,144,146,148,150,152,154,156,158,160,162,1 64,166,168,170,172,174,176,177,179,181,183,185,187,189,191,193,195,197,199,201,203,20 5,207,209,211,213,215,217,219,221,223,225,227,229,231,233,235,237,239,241,243,245,247, 249,251,253,255,257,259,261,263,265,267,269,271,273, 275,277,279,281,283,285,287,289,2 91,293,295,297,299,301,303,305,307,309,311,313,315,317,319,321,323,325,327,329,331,33 3,335,337,339,341,343,345,347,349,351,353,355,357,359,361,363,365,367,369,371,373,375, 377,379,381,383,385,386,388,390,392,394,396,398,400,402,404,406,408,410,412,414,416,4 18,420,422,424,426,428,430,432,434,436,438,440,442,444,446,448,450,452,454,456,458,46 0,462,464,466,468,470,472,474,476,478,480,482,484,486,488,490,492,494,496,498,500,502, 504,506,508,510,512,514,516,518,520,522,524,526,528,530,532,534,536,538,540,542,544,5 46,548,550,552,554,556,558,560,562,564,566,568,570,572,574,576,578,580,582,584,586,58 8,590,592,594,596,598,600,602,604,606,608,610,612,614,616,618,620,622,624,626,628,630, 632,634,636,638,640,642,644,646,648,650,652,654,656,658,660,662,664,666,668,670,672,6 74,676,678,680,682,684,686,688,690,692,694,696,698,700,702,704,706,708,710,712,714,71 6,718,720,722,724,726,728,730,732,734,736,738,740,742,744,746,748,750,752,754,756,758, 760,762,764,766,768,770,772,774,776,778,780,782,784,786,788,790,792,794,796,798,800,8 02,804,805].

Specifically, when $N_g$ is 4 and $N_{CB}$ is 4, the feedback subcarrier indices may be configured like below:

[−805,−804,−800,−796,−792,−788,−784,−780,−776,−772,−768,−764,−760,−756,−752,−748,−744,−740,−736,−732,−728,−724,−720,−716,−712,−708,−704,−700,−696,−692,−688,−684,−680,−676,−672,−668,−664,−660,−656,−652,−648,−644,−640,−636,−632,−628,−624,−620,−616,−612,−608,−604,−600,−596,−594,−590,−586,−582,−578,−574,−570,−566,−562,−558,−554,−550,−546,−542,−538,−534,−530,−526,−522,−518,−514,−510,−506,−502,−498,−494,−490,−486,−482,−478,−474,−470,−466,−462,−458,−454,−450,−446,−442,−438,−434,−430,−426,−422,−418,−414,−410,−406,−402,−398,−394,−390,−386,−385,−381,−377,−373,−369,−365,−361,−357,−353,−349,−345,−341,−337,−333,−329,−325,−321,−317,−313,−309,−305,−301,−297,−293,−289,−285,−281,−277,−273,−269,−265,−261,−257,−253,−249,−245,−241,−237,−233,−229,−225,−221,−217,−213,−209,−205,−201,−197,−193,−189,−185,−181,−177,−174,−170,−166,−162,−158,−154,−150,−146,−142,−138,−134,−130,−126,−122,−118,−114,−110,−106,−102,−98,−94,−90,−86,−82,−78,−74,−70,−66,−62,−58,−54,−50,−46,−42,−38,−34,−30,−26,−22,−18,−14,−10,−6,−2,2,6,10,14,18,22,26,30,34,38,42,46,50,54,58,62,66,70,74,78,82,86,90,94,98,102, 106,110,114,118,122,126,130,134,138,142,146,150,154,158,162,166,170,174,177,181,185,1 89,193,197,201,205,209,213,217,221,225,229,233,237,241,245,249,253,257,261,265,269,27 3,277,281,285,289,293,297,301,305,309,313,317,321,325,329,333,337,341,345,349,353,357, 361,365,369,373,377,381,385,386,390,394,398,402,406,410,414,418,422,426,430,434,438,4 42,446,450,454,458,462,466,470,474,478,482,486,490,494,498,502,506,510,514,518,522,52 6,530,534,538,542,546,550,554,558,562,566,570,574,578,582,586,590,594,596,596,600,604, 608,612,616,620,624,628,632,636,640,644,648,652,656,660,664,668,672,676,680,684,688,6 92,696,700,704,708,712,716,720,724,728,732,736,740,744,748,752,756,760,764,768,772,77 6,780,784,788,792,796,800,804,805].

Specifically, when Ng is 8 and $N_{CB}$ is 4, the feedback subcarrier indices may be configured like below:

[−805,−804,−796,−788,−780,−772,−764,−756,−748,−740,−732,−724,−716,−708,−700,−692,−684,−676,−668,−660,−652,−644,−636,−628,−620,−612,−604,596,−594,−586,−578,−570,−562, −554,−546,−538,−530,−522,−514,−506,−498,−490,−482,−474,−466,−458,−450,−442,−434,−426,−418, −410,−402,−394,−386,−385,−377,−369,−361,−353,−345,−337,−329,−321,−313,−305,−297,−289,−281,−273,−265,−257,−249,−241,−233,−225,−217,−209,−201,−193,−185,−177,−170,−162,−154,−146,−138, −130,−122,−

114,−106,−98,−90,−82,−74,−66,−58,−50,−42,−34,−26,−18,−10,−2,2,10,18,26,34,42,50,5 8,62,70,78,86,94,102,110, 118,126,134,142,150,158,166,174,177,185,193,201,209, 217,225,2 33,241,249,257,265,273,281,289,297,305,313, 321,329,337,345,353,361,369,377,385,386,39 4,402,410, 418,426,434,442,450,458,466,474,482,490,498,506,514, 522,530,538,546,554,562, 570,578,586,594,596,604,612, 620,628,636,644,652,660,668,676,684,692,700,708,716, 724,7 32,740,748,756,764,772,780,788,796,804,805].

3. Device Configuration

Figure 14:
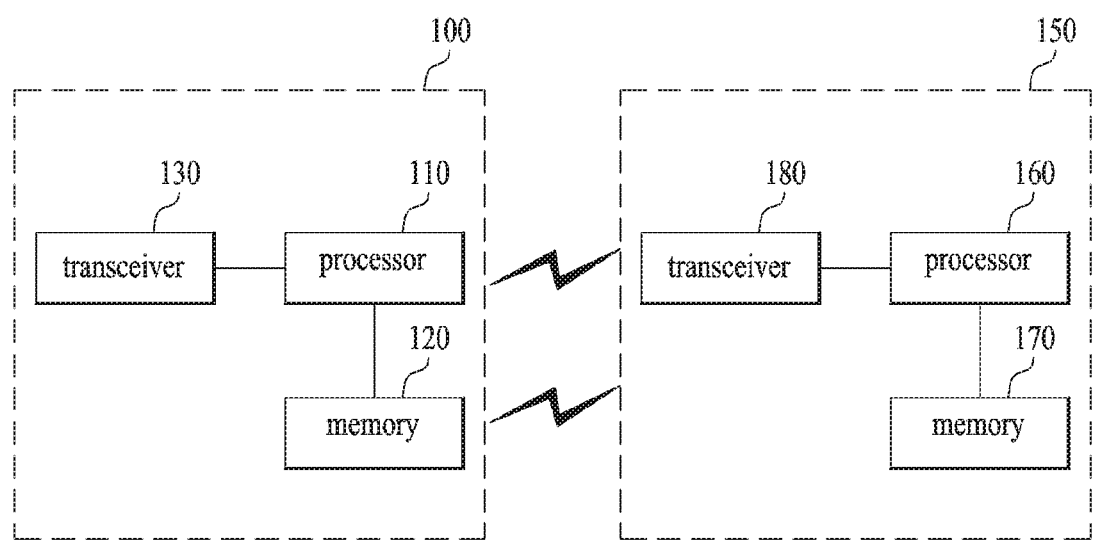
FIG. 14 is a diagram illustrating configuration of a user equipment and a base station by which the proposed embodiments may be implemented.

FIG. 14 is a diagram illustrating devices for implementing the above-described method.

The wireless device 100 of FIG. 14 may correspond to a transmitting device of the above description, and the wireless device 150 may correspond to the receiving device of the above description.

The STA 100 may include a processor 110, a memory 120 and a transceiver 130. The PCP/AP 150 may include a processor 160, a memory 170, and a transceiver 180. The transceivers 130 and 180 may transmit/receive wireless signals and may be implemented in a physical layer such as IEEE 802.11/3GPP. The processors 110 and 160 are implemented in the physical layer and/or MAC layer and are connected to the transceivers 130 and 180.

Herein, each of the transmitting device 100 and the receiving device 150 include transceiver 130 and 180 and processor 110 and 160. In this case, the processor is operably connected to the transceiver and the memory. Herein, the memory 120 and 170 may be located inside or outside of the transmitting device 100 and the receiving device 150.

Or, each of the transmitting device 100 and the receiving device 150 include processor 110 and 160 and memory 120 and 170. In this case, the processor is operably connected to the transceiver and the memory. Herein, the transceiver 130 and 180 may be located inside or outside of the transmitting device 100 and the receiving device 150.

In the present invention, the communication device comprises a memory and a processor operably coupled to the memory. Herein, the processor is configured to obtain feedback subcarrier indices for the beamforming feedback information based on a $N_g$ value of subcarrier groupings and a number $N_{CB}$ of bonded channel and transmit the beamforming feedback information comprising channel information related to the feedback subcarrier indices.

Further, the receiving device comprises a memory and a processor operably coupled to the memory. Herein, the processor is configured to receive the beamforming feedback information comprising channel information related to a number $N_{CB}$ of bonded channel.

Herein, When $N_{CB}$ is equal to 1, the feedback subcarrier indices based on $N_g$ comprises:

A subcarrier index −177

First subcarrier indices having the distance equal to multiple of $N_g$ from a subcarrier index −2 between the subcarrier index −177 and the subcarrier index −2

The subcarrier index −2

A subcarrier index 2

Second subcarrier indices having the distance equal to multiple of $N_g$ from the subcarrier index 2 between the subcarrier index 2 and the subcarrier index 177

A subcarrier index 177

And, as disclosed above, the feedback subcarrier indices based on $N_g$ may have a nested structure. That is, when $N_{CB}$ is equal to N+1 (where, N is equal to or larger than 1), the feedback subcarrier based on $N_g$ indices comprises:

First feedback subcarrier indices based on $N_g$ in case that $N_{CB}$ is equal to N. Herein, the first feedback subcarrier indices based on $N_g$ comprises edge subcarrier indices based on $N_g$ in case that $N_{CB}$ is equal to N. The edge subcarrier indices based on $N_g$ in case that $N_{CB}$ is equal to N comprise a first edge subcarrier index and a second edge subcarrier index, and the first edge subcarrier index is smaller than the second edge subcarrier index.

Edge subcarrier indices based on $N_g$ in case that $N_{CB}$ is equal to N+1. Herein, the edge subcarrier indices based on $N_g$ in case that $N_{CB}$ is equal to N+1 comprises a third edge subcarrier index and a fourth edge subcarrier index, and the third edge subcarrier index is smaller than the fourth edge subcarrier index.

Third subcarrier indices having a distance equal to multiple of $N_g$ from the first edge subcarrier index between the first edge subcarrier index and the third edge subcarrier index Fourth subcarrier indices having the distance equal to multiple of $N_g$ from the second edge subcarrier index between the second edge subcarrier index and the fourth edge subcarrier index The processors 110 and 160 and/or the transceivers 130 and 180 may include application specific integrated circuits (ASICs), other chipsets, logic circuits, and/or data processors. The memories 120 and 170 may include a read-only memory (ROM), a random access memory (RAM), a flash memory, a memory card, a storage medium and/or other storage units. When an embodiment is executed by software, the method described above may be executed as a module (e.g., a process, a function) that performs the functions described above. The module may be stored in the memory 120,170 and executed by the processor 110,160. The memory 120, 170 may be located inside or outside the processor 110, 160 and may be connected to the processor 110, 160 by a well-known means.

The detailed description of preferred embodiments of the invention set forth above is provided to enable those skilled in the art to implement and practice the invention. Although the present invention has been fully described by way of example with reference to the accompanying drawings, it is to be understood that various modifications and changes may be made in the invention without departing from the scope and spirit of the invention. Accordingly, the present invention is not intended to be limited to the embodiments disclosed herein but is to be accorded the widest scope consistent with the principles and novel features disclosed herein.

What is claimed is:

1. A method for transmitting beamforming feedback information by a station (STA) in a wireless local access network (WLAN) system, the method comprising:

obtaining information on feedback subcarrier indices for the beamforming feedback information, based on an $N_g$ value of subcarrier groupings and a number $N_{CB}$ of bonded channel, wherein $N_{CB}$ is one of 1, 2, 3 and/or 4; and transmitting the beamforming feedback information comprising channel information related to the feedback subcarrier indices, wherein when $N_{CB}$ is equal to 1, the feedback subcarrier indices based on $N_g$ comprise:

a subcarrier index −177;

first subcarrier indices having a distance equal to a multiple of $N_g$ from a subcarrier index −2 between the subcarrier index −177 and the subcarrier index −2;

the subcarrier index −2;

a subcarrier index 2;
second subcarrier indices having a distance equal to a multiple of $N_g$ from the subcarrier index 2 between the subcarrier index 2 and a subcarrier index 177; and
the subcarrier index 177, and
wherein when $N_{CB}$ is equal to N+1, the feedback subcarrier based on $N_g$ indices comprises, wherein N is equal to or larger than 1:
first feedback subcarrier indices based on $N_g$ in case that $N_{CB}$ is equal to N,
wherein the first feedback subcarrier indices based on $N_g$ comprises edge subcarrier indices based on $N_g$ in case that $N_{CB}$ is equal to N,
wherein the edge subcarrier indices based on $N_g$ in case that $N_{CB}$ is equal to N comprise a first edge subcarrier index and a second edge subcarrier index, wherein the first edge subcarrier index is smaller than the second edge subcarrier index;
edge subcarrier indices based on $N_g$ in case that $N_{CB}$ is equal to N+1,
wherein the edge subcarrier indices based on $N_g$ in case that $N_{CB}$ is equal to N+1 comprise a third edge subcarrier index and a fourth edge subcarrier index, wherein the third edge subcarrier index is smaller than the fourth edge subcarrier index;
third subcarrier indices having a distance equal to a multiple of $N_g$ from the first edge subcarrier index between the first edge subcarrier index and the third edge subcarrier index; and
fourth subcarrier indices having a distance equal to a multiple of $N_g$ from the second edge subcarrier index between the second edge subcarrier index and the fourth edge subcarrier index.

2. The method of claim 1, wherein $N_g$ is one of 2, 4 and/or 8.

3. The method of claim 1, wherein edge subcarrier indices based on $N_g$ in case that $N_{CB}$ is equal to 2 are subcarrier indices −386 and 386.

4. The method of claim 1, wherein edge subcarrier indices based on $N_g$ in case that $N_{CB}$ is equal to 3 are subcarrier indices −596 and 596.

5. The method of claim 1, wherein edge subcarrier indices based on $N_g$ in case that $N_{CB}$ is equal to 4 are subcarrier indices −805 and 805.

6. The method of claim 1, wherein when $N_g$ is 2 and $N_{CB}$ is 1, the feedback subcarrier indices are:
[−177,−176,−174,−172,−170,−168,−166,−164,−162,−160,−158,−156,−154,−152,−150,−148,−146,−144,−142,−140,−138,−136,−134,−132,−130,−128,−126,−124,−122,−120,−118,−116,−114,−112,−110,−108,−106,−104,−102,−100,−98,−96,−94,−92,−90,−88,−86,−84,−82,−80,−78,−76,−74,−72,−70,−68,−66,−64,−62,−60,−58,−56,−54,−52,−50,−48,−46,−44,−42,−40,−38,−36,−34,−32,−30,−28,−26,−24,−22,−2 0,−18,−16,−14,−12,−10,−8,−6,−4,−2,2,4,6,8,10,12,14,16,18,20,22,24, 26,28,30,32,34,36,38,40,42, 44,46,48,50,52,54,56,58, 60,62,64,66,68,70,72,74,76,78,80,82,84,86,88,90,92, 94,96,98,100,1 02,104,106,108,110,112,114,116,118, 120,122,124,126,128,130,132,134,136,138,140,142,14 4,146,148,150,152,154,156,158,160,162,164,166,168, 170,172,174,176,177].

7. The method of claim 1, wherein when $N_g$ is 4 and $N_{o3}$ is 1, the feedback subcarrier indices are:
[−177,−174,−170,−166,−162,−158,−154,−150,−146,−142,−138,−134,−130,−126,−122,−118,−114,−110,−106,−102,−98,−94,−90,−86,−82,−78,−74,−70,−66,−62,−58,−54,−50,−46,−42,−38,−34,−30,−2 6,−22,−18,−14,−10,−6,−2,2,6,10,14,18,22,26,30,34,38,42,46,50, 54,58,62,66,70,74,78,82,86,90,9 4,98,102,106,110, 114,118,122,126,130,134,138,142,146,150,154,158, 162,166,170,174,177].

8. The method of claim 1, wherein when $N_g$ is 8 and $N_{o3}$ is 1, the feedback subcarrier indices are:
[−177,−170,−162,−154,−146,−138,−130,−122,−114,−106,−98,−90,−82,−74,−66,−58,−50,−42,−34,−26,−18,−10,−2,2,10,18,26,34,42,50,58,66,74,82,90,98,106, 114,122,130,138,146,154,162,1 70,177].

9. The method of claim 1, wherein when $N_g$ is 2 and $N_{CB}$ is 2, the feedback subcarrier indices are:
[−386,−385,−383,−381,−379,−377,−375,−373,−371,−369,−367,−365,−363,−361,−359,−357,−355,−353,−351,−349,−347,−345,−343,−341,−339,−337,−335,−333,−331,−329,−327,−325,−323,−321,−319,−317,−315,−313,−311,−309,−307,−305,−303,−301,−299,−297,−295,−293,−291,−289,−287,−285,−283,−281,−279,−277,−275,−273,−271,−269,−267,−265,−263,−261,−259,−257,−255,−253,−251,−249,−247,−245,−243,−241,−239,−237,−235,−233,−231,−229,−227,−225,−223,−221,−219,−217,−215,−213,−211,−209,−207,−205,−203,−201,−199,−197,−195,−193,−191,−189,−187,−185,−183,−181,−179,−177,−176,−174,−172,−170,−168,−166,−164,−162,−160,−158,−156,−154,−152,−150,−148,−146,−144,−142,−140,−138,−136,−134,−132,−130,−128,−126,−124,−122,−120,−118,−116,−114,−112,−110,−108,−106,−104,−102,−100,−98,−96,−94,−92,−90,−88,−86,−84,−82,−80,−78,−76,−74,−72,−70,−68,−66,−64,−62,−60, −58,−56,−54,−52,−50,−48,−46,−44,−42,−40,−38,−36,−34,−32,−30,−28,−26,−24,−22,−20,−18,−16,−14,−1 2,−10,−8,−6,−4,−2,2,4,6,8,10,12,14,16,18,20,22,24,26,28,30,32, 34,36,38,40,42,44,46,48,50,52, 54,56,58,60,62,64,66, 68,70,72,74,76,78,80,82,84,86,88,90,92,94,96,98,100, 102,104,106,108, 110,112,114,116,118,120,122,124, 126,128,130,132,134,136,138,140,142,144,146,148, 150,1 52,154,156,158,160,162,164,166,168,170,172, 174,176,177,179,181,183,185,187,189,191,19 3,195, 197,199,201,203,205,207,209,211,213,215,217,219, 221,223,225,227,229,231,233,235, 237,239,241,243, 245,247,249,251,253,255,257,259,261,263,265,267, 269,271,273,275,277,2 79,281,283,285,287,289,291, 293,295,297,299,301,303,305,307,309,311,313,315, 317,319,32 1,323,325,327,329,331,333,335,337,339, 341,343,345,347,349,351,353,355,357,359,361,363, 365,367,369,371,373,375,377,379,381,383,385,386].

10. The method of claim 1, wherein when $N_g$ is 4 and $N_{CB}$ is 2, the feedback subcarrier indices are:
[−386,−385,−381,−377,−373,−369,−365,−361,−357,−353,−349,−345,−341,−337,−333,−329,−325,−321,−317,−313,−309,−305,−301,−297,−293,−289,−285,−281,−277,−273,−269,−265,−261,−257,−253,−249,−245,−241,−237,−233,−229,−225,−221,−217,−213,−209,−205,−201,−197,−193,−189,−185,−181,−177,−174,−170,−166,−162,−158,−154,−150,−146,−142,−138,−134,−130,−126,−122,−118,−114,−110,−106,−102,−98,−94,−90,−86,−82,−78,−74,−70,−66,−62,−58,−54,−50,−46,−42,−38,−34,−30,−26,−22, −18,−14,−10,−6,−2,2,6,10,14,18,22,26,30,34,38,42,46,50,54,58, 62,66,70,74,78,82,86,90,94,98, 102,106,110,114,118, 122,126,130,134,138,142,146,150,154,158,162,166, 170,174,177,181,1 85,189,193,197,201,205,209,213, 217,221,225,229,233,237,241,245,249,253,257,261, 265,26 9,273,277,281,285,289,293,297,301,305,309, 313,317,321,325,329,333,337,341,345,349,353, 357, 361,365,369,373,377,381,385,386].

11. The method of claim 1, wherein when $N_g$ is 8 and $N_{CB}$ is 2, the feedback subcarrier indices are:

[−386,−385,−377,−369,−361,−353,−345,−337,−329,−321,−313,−305,−297,−289,−281,−273,−265,−257,−249,−241,−233,−225,−217,−209,−201,−193,−185,−177,−170,−162,−154,−146,−138,−130,−122,−114,−106,−98,−90,−82,−74,−66,−58,−50,−42,−34,−26,−18,−10,−2,2,10,18,26,34,42,50,58,62,7 0,78,86,94, 102,110,118,126,134,142,150,158,166,174,177,185, 193,201,209,217,225,233,241, 249,257,265,273,281, 289,297,305,313,321,329,337,345,353,361,369,377, 385,386].

12. The method of claim 1, wherein when $N_g$ is 2 and $N_{CB}$ is 3, the feedback subcarrier indices are:

[−596,−594,−592,−590,−588,−586,−584,−582,−580,−578,−576,−574,−572,−570,−568,−566,−564,−562,−560,−558,−556,−554,−552,−550,−548,−546,−544,−542,−540,−538,−536,−534,−532,−530,−528,−526,−524,−522,−520,−518,−516,−514,−512,−510,−508,−506,−504,−502,−500,−498,−496,−494,−492,−490,−488,−486,−484,−482,−480,−478,−476,−474,−472,−470,−468,−466,−464,−462,−460,−458,−456,−454,−452,−450,−448,−446,−444,−442,−440,−438,−436,−434,−432,−430,−428,−426,−424,−422,−420,−418,−416,−414,−412,−410,−408,−406,−404,−402,−400,−398,−396,−394,−392,−390,−388,−386,−385,−383,−381,−379,−377,−375,−373,−371,−369,−367,−365,−363,−361,−359,−357,−355,−353,−351,−349,−347,−345,−343,−341,−339,−337,−335,−333,−331,−329,−327,−325,−323,−321,−319,−317,−315,−313,−311,−309,−307,−305,−303,−301,−299,−297,−295,−293,−291,−289,−287,−285,−283,−281,−279,−277,−275,−273,−271,−269,−267,−265,−263,−261,−259,−257,−255,−253,−251,−249,−247,−245,−243,−241,−239,−237,−235,−233,−231,−229,−227,−225,−223,−221,−219,−217,−215,−213,−211,−209,−207,−205,−203,−201,−199,−197,−195,−193,−191,−189,−187,−185,−183,−181,−179,−177,−176,−174,−172,−170,−168,−166,−164,−162,−160,−158,−156,−154,−152,−150,−148,−146,−144,−142,−140,−138,−136,−134,−132,−130,−128,−126,−124,−122,−120,−118,−116,−114,−112,−110,−108,−106,−104,−102,−100,−98,−96,−94,−92,−90,−88,−86,−84,−82,−80,−78,−76,−74,−72,−70,−68,−66,−64,−62,−60,−58,−56,−54,−52,−50,−48,−46,−44,−42,−40,−38,−36,−34,−32,−30,−28,−26,−24,−22,−20,−18,−16,−14,−12,−10,−8,−6,−4,−2, 2,4,6,8,10,12, 14,16,18,20,22,24,26,28,30,32,34,36,38,40,42,44,46, 48,50,52,54,56,58,60,62,6 4,66,68,70,72,74,76,78,80, 82,84,86,88,90,92,94,96,98,100,102,104,106,108,110, 112,114,116, 118,120,122,124,126,128,130,132,134, 136,138,140,142,144,146,148,150,152,154,156,158,1 60,162,164,166,168,170,172,174,176,177,179,181, 183,185,187,189,191,193,195,197,199,20 1,203,205, 207,209,211,213,215,217,219,221,223,225,227,229, 231,233,235,237,239,241,243, 245,247,249,251,253, 255,257,259,261,263,265,267,269,271,273,275,277, 279,281,283,285,2 87,289,291,293,295,297,299,301, 303,305,307,309,311,313,315,317,319,321,323,325, 327,32 9,331,333,335,337,339,341,343,345,347,349, 351,353,355,357,359,361,363,365,367,369,371, 373, 375,377,379,381,383,385,386,388,390,392,394,396, 398,400,402,404,406,408,410,412,4 14,416,418,420, 422,424,426,428,430,432,434,436,438,440,442,444, 446,448,450,452,454,45 6,458,460,462,464,466,468, 470,472,474,476,478,480,482,484,486,488,490,492, 494,496,498, 500,502,504,506,508,510,512,514,516, 518,520,522,524,526,528,530,532,534,536,538,540,5 42,544,546,548,550,552,554,556,558,560,562,564, 566,568,570,572,574,576,578,580,582,58 4,586,588, 590,592,594,596].

13. The method of claim 1, wherein when $N_g$ is 4 and $N_{CB}$ is 3, the feedback subcarrier indices are:

[−596,−594,−590,−586,−582,−578,−574,−570,−566,−562,−558,−554,−550,−546,−542,−538,−534,−530,−526,−522,−518,−514,−510,−506,−502,−498,−494,−490,−486,−482,−478,−474,−470,−466,−462,−458,−454,−450,−446,−442,−438,−434,−430,−426,−422,−418,−414,−410,−406,−402,−398,−394,−390,−386,−385,−381,−377,−373,−369,−365,−361,−357,−353,−349,−345,−341,−337,−333,−329,−325,−321,−317,−313,−309,−305,−301,−297,−293,−289,−285,−281,−277,−273,−269,−265,−261,−257,−253,−249,−245,−241,−237,−233,−229,−225,−221,−217,−213,−209,−205,−201,−197,−193,−189,−185,−181,−177,−174,−170,−166,−162,−158,−154,−150,−146,−142,−138,−134,−130,−126,−122,−118,−114,−110,−106,−102,−98,−94,−90,−86,−82,−78,−74,−70,−66,−62,−58,−54,−50,−46,−42,−38,−34,−30,−26,−22,−18,−14,−10,−6,−2, 2,6,10,14,18,22,26,30,34,38,42,46,50,54,58,62,66,70, 74,78,82,86,90,94,98,102,1 06,110,114,118,122,126, 130,134,138,142,146,150,154,158,162,166,170,174, 177,181,185,18 9,193,197,201,205,209,213,217,221, 225,229,233,237,241,245,249,253,257,261,265,269, 273, 277,281,285,289,293,297,301,305,309,313,317, 321,325,329,333,337,341,345,349,353,357,3 61,365, 369,373,377,381,385,386,390,394,398,402,406,410, 414,418,422,426,430,434,438,44 2,446,450,454,458, 462,466,470,474,478,482,486,490,494,498,502,506, 510,514,518,522,526, 530,534,538,542,546,550,554, 558,562,566,570,574,578,582,586,590,594,596].

14. The method of claim 1, wherein when $N_g$ is 8 and $N_{CB}$ is 3, the feedback subcarrier indices are:

[−596,−594,−586,−578,−570,−562,−554,−546,−538,−530,−522,−514,−506,−498,−490,−482,−474,−466,−458,−450,−442,−434,−426,−418,−410,−402,−394,−386,−385,−377,−369,−361,−353,−345,−337,−329,−321,−313,−305,−297,−289,−281,−273,−265,−257,−249,−241,−233,−225,−217,−209,−201,−193,−185,−177,−170,−162,−154,−146,−138,−130,−122,−114,−106,−98,−90,−82,−74,−66,−58,−50,−42, −34,−26,−18,−10,−2,2,10,18,26,34,42,50,58,62,70,78,86,94,102, 110,118,126,134,142,150,158, 166,174,177,185,193, 201,209,217,225,233,241,249,257,265,273,281,289, 297,305,313,321,3 29,337,345,353,361,369,377,385, 386,394,402,410,418,426,434,442,450,458,466,474, 482,49 0,498,506,514,522,530,538,546,554,562,570, 578,586,594,596].

15. The method of claim 1, wherein when $N_g$ is 2 and $N_{CB}$ is 4, the feedback subcarrier indices are:

[−805,−804,−802,−800,−798,−796,−794,−792,−790,−788,−786,−784,−782,−780,−778,−776,−774,−772,−770,−768,−766,−764,−762,−760,−758,−756,−754,−752,−750,−748,−746,−744,−742,−740,−738,−736,−734,−732,−730,−728,−726,−724,−722,−720,−718,−716,−714,−712,−710,−708,−706,−704,−702,−700,−698,−696,−694,−692,−690,−688,−686,−684,−682,−680,−678,−676,−674,−672,−670,−668,−666,−664,−662,−660,−658,−656,−654,−652,−650,−648,−646,−644,−642,−640,−638,−636,−634,−632,−630,−628,−626,−624,−622,−620,−618,−616,−614,−612,−610,−608,−606,−604,−602,−600,−598,−596,−594,−592,−590,−588,−586,−584,−582,−580,−578,−576,−574,−572,−570,−568,−566,−564,−562,−560,−558,−556,−554,−552,−550,−548,−546,−544,−542,−540,−538,−

536,−534,−532,−530,−528,−526,−524,−522,−520,−518,−516,−514,−512,−510,−508,−506,−504,−502,−500,−498,−496,−494,−492,−490,−488,−486,−484,−482,−480,−478,−476,−474,−472,−470,−468,−466,−464,−462,−460,−458,−456,−454,−452,−450,−448,−446,−444,−442,−440,−438,−436,−434,−432,−430,−428,−426,−424,−422,−420,−418,−416,−414,−412,−410,−408,−406,−404,−402,−400,−398,−396,−394,−392,−390,−388,−386,−385,−383,−381,−379,−377,−375,−373,−371,−369,−367,−365,−363,−361,−359,−357,−355,−353,−351,−349,−347,−345,−343,−341,−339,−337,−335,−333,−331,−329,−327,−325,−323,−321,−319,−317,−315,−313,−311,−309,−307,−305,−303,−301,−299,−297,−295,−293,−291,−289,−287,−285,−283,−281,−279,−277,−275,−273,−271,−269,−267,−265,−263,−261,−259,−257,−255,−253,−251,−249,−247,−245,−243,−241,−239,−237,−235,−233,−231,−229,−227,−225,−223,−221,−219,−217,−215,−213,−211,−209,−207,−205,−203,−201,−199,−197,−195,−193,−191,−189,−187,−185,−183,−181,−179,−177,−176,−174,−172,−170,−168,−166,−164,−162,−160,−158,−156,−154,−152,−150,−148,−146,−144,−142,−140,−138,−136,−134,−132,−130,−128,−126,−124,−122,−120,−118,−116,−114,−112,−110,−108,−106,−104,−102,−100,−98,−96,−94,−92,−90,−88,−86,−84,−82,−80,−78,−76,−74,−72,−70,−68,−66,−64,−62,−60,−58,−56,−54,−52,−50,−48,−46,−44,−42,−40,−38,−36,−34,−32,−30,−28,−26,−24,−22,−20,−18,−16,−14,−12,−10,−8,−6,−4,−2,2,4,6,8,10,12,1 4,16,18,20,22,24,26,28,30,32,34,36,38,40,42,44,46,48,50,52,54,56,58, 60,62,64,66,68,70,72,7 4,76,78,80,82,84,86,88,90,92, 94,96,98,100,102,104,106,108,110,112,114,116,118, 120,122,1 24,126,128,130,132,134,136,138,140,142, 144,146,148,150,152,154,156,158,160,162,164,16 6,168,170,172,174,176,177,179,181,183,185,187,189, 191,193,195,197,199,201,203,205,207, 209,211,213, 215,217,219,221,223,225,227,229,231,233,235,237, 239,241,243,245,247,249,2 51,253,255,257,259,261, 263,265,267,269,271,273,275,277,279,281,283,285, 287,289,291,29 3,295,297,299,301,303,305,307,309, 311,313,315,317,319,321,323,325,327,329,331,333, 335, 337,339,341,343,345,347,349,351,353,355,357, 359,361,363,365,367,369,371,373,375,377,3 79,381, 383,385,386,388,390,392,394,396,398,400,402,404, 406,408,410,412,414,416,418,42 0,422,424,426,428, 430,432,434,436,438,440,442,444,446,448,450,452, 454,456,458,460,462, 464,466,468,470,472,474,476, 478,480,482,484,486,488,490,492,494,496,498,500, 502,504,5 06,508,510,512,514,516,518,520,522,524, 526,528,530,532,534,536,538,540,542,544,546,54 8,550,552,554,556,558,560,562,564,566,568,570,572, 574,576,578,580,582,584,586,588,590, 592,594,596, 598,600,602,604,606,608,610,612,614,616,618,620, 622,624,626,628,630,632,6 34,636,638,640,642,644, 646,648,650,652,654,656,658,660,662,664,666,668, 670,672,674,67 6,678,680,682,684,686,688,690,692, 694,696,698,700,702,704,706,708,710,712,714,716, 718, 720,722,724,726,728,730,732,734,736,738,740, 742,744,746,748,750,752,754,756,758,760,7 62,764, 766,768,770,772,774,776,778,780,782,784,786,788, 790,792,794,796,798,800,802,80 4,805].

16. The method of claim 1, wherein when $N_g$ is 4 and $N_{CB}$ is 4, the feedback subcarrier indices are:

[−805,−804,−800,−796,−792,−788,−784,−780,−776,−772,−768,−764,−760,−756,−752,−748,−744,−740,−736,−732,−728,−724,−720,−716,−712,−708,−704,−700,−696,−692,−688,−684,−680,−676,−672,−668,−664,−660,−656,−652,−648,−644,−640,−636,−632,−628,−624,−620,−616,−612,−608,−604,−600,−596,−594,−590,−586,−582,−578,−574,−570,−566,−562,−558,−554,−550,−546,−542,−538,−534,−530,−526,−522,−518,−514,−510,−506,−502,−498,−494,−490,−486,−482,−478,−474,−470,−466,−462,−458,−454,−450,−446,−442,−438,−434,−430,−426,−422,−418,−414,−410,−406,−402,−398,−394,−390,−386,−385,−381,−377,−373,−369,−365,−361,−357,−353,−349,−345,−341,−337,−333,−329,−325,−321,−317,−313,−309,−305,−301,−297,−293,−289,−285,−281,−277,−273,−269,−265,−261,−257,−253,−249,−245,−241,−237,−233,−229,−225,−221,−217,−213,−209,−205,−201,−197,−193,−189,−185,−181,−177,−174,−170,−166,−162,−158,−154,−150,−146,−142,−138,−134,−130,−126,−122,−118,−114,−110,−106,−102,−98,−94,−90,−86,−82,−78,−74,−70,−66,−62,−58,−54,−50,−46,−42,−38,−34,−30,−26,−22,−18,−14,−1 0,−6,−2,2,6,10, 14,18,22,26,30,34,38,42,46,50,54,58,62,66,70,74,78, 82,86,90,94,98,102,106,1 10,114,118,122,126,130, 134,138,142,146,150,154,158,162,166,170,174,177, 181,185,189,19 3,197,201,205,209,213,217,221,225, 229,233,237,241,245,249,253,257,261,265,269,273, 277, 281,285,289,293,297,301,305,309,313,317,321, 325,329,333,337,341,345,349,353,357,361,3 65,369, 373,377,381,385,386,390,394,398,402,406,410,414, 418,422,426,430,434,438,442,44 6,450,454,458,462, 466,470,474,478,482,486,490,494,498,502,506,510, 514,518,522,526,530, 534,538,542,546,550,554,558, 562,566,570,574,578,582,586,590,594,596,596,600, 604,608,6 12,616,620,624,628,632,636,640,644,648, 652,656,660,664,668,672,676,680,684,688,692,69 6,700,704,708,712,716,720,724,728,732,736,740,744, 748,752,756,760,764,768,772,776,780, 784,788,792, 796,800,804,805].

17. The method of claim 1, wherein when Ng is 8 and $N_{CB}$ is 4, the feedback subcarrier indices are:

[−805,−804,−796,−788,−780,−772,−764,−756,−748,−740,−732,−724,−716,−708,−700,−692,−684,−676,−668,−660,−652,−644,−636,−628,−620,−612,−604, 596,−594,−586,−578,−570,−562,−554,−546,−538,−530,−522,−514,−506,−498,−490,−482,−474,−466,−458,−450,−442,−434,−426,−418,−410,−402,−394,−386,−385,−377,−369,−361,−353,−345,−337,−329,−321,−313,−305,−297,−289,−281,−273,−265,−257,−249,−241,−233,−225,−217,−209,−201,−193,−185,−177,−170,−162,−154,−146,−138,−130,−122,−114,−106,−98,−90,−82,−74,−66,−58,−50,−42,−34,−26,−18,−10,−2,2,10,18,26,34,42,50,58,62,7 0,78,86,94, 102,110,118,126,134,142,150,158,166,174,177,185, 193,201,209,217,225,233,241, 249,257,265,273,281, 289,297,305,313,321,329,337,345,353,361,369,377, 385,386,394,402,4 10,418,426,434,442,450,458,466, 474,482,490,498,506,514,522,530,538,546,554,562, 570,57 8,586,594,596,604,612,620,628,636,644,652, 660,668,676,684,692,700,708,716,724,732,740, 748, 756,764,772,780,788,796,804,805].

18. A communication device for transmitting beamforming feedback information in a wireless local access network (WLAN) system, the communication device comprising:

a memory; and a processor operably coupled to the memory and configured to:

obtain feedback subcarrier indices for the beamforming feedback information based on an $N_g$ value of subcarrier groupings and a number $N_{CB}$ of bonded channel, wherein $N_{CB}$ is one of 1, 2, 3 and/or 4; and transmit the beamforming feedback information comprising channel information related to the feedback subcarrier indices, wherein when $N_{CB}$ is equal to 1, the feedback subcarrier indices based on $N_g$ comprises:

a subcarrier index −177;

first subcarrier indices having a distance equal to a multiple of $N_g$ from a subcarrier index −2 between the subcarrier index −177 and the subcarrier index −2;

the subcarrier index −2;

a subcarrier index 2;

second subcarrier indices having a distance equal to a multiple of $N_g$ from the subcarrier index 2 between the subcarrier index 2 and the subcarrier index 177; and the subcarrier index 177, and wherein when $N_{CB}$ is equal to N+1, the feedback subcarrier based on $N_g$ indices comprises, wherein N is equal to or larger than 1:

first feedback subcarrier indices based on $N_g$ in case that $N_{CB}$ is equal to N, wherein the first feedback subcarrier indices based on $N_g$ comprises edge subcarrier indices based on $N_g$ in case that $N_{CB}$ is equal to N, wherein the edge subcarrier indices based on $N_g$ in case that $N_{CB}$ is equal to N comprise a first edge subcarrier index and a second edge subcarrier index, wherein the first edge subcarrier index is smaller than the second edge subcarrier index;

edge subcarrier indices based on $N_g$ in case that $N_{CB}$ is equal to N+1, wherein the edge subcarrier indices based on $N_g$ in case that $N_{CB}$ is equal to N+1 comprises a third edge subcarrier index and a fourth edge subcarrier index, wherein the third edge subcarrier index is smaller than the fourth edge subcarrier index;

third subcarrier indices having a distance equal to multiple of $N_g$ from the first edge subcarrier index between the first edge subcarrier index and the third edge subcarrier index; and fourth subcarrier indices having a distance equal to multiple of $N_g$ from the second edge subcarrier index between the second edge subcarrier index and the fourth edge subcarrier index.

19. A communication device for receiving beamforming feedback information in a wireless local access network (WLAN) system, the communication device comprising:

a memory; and a processor operably coupled to the memory and configured to:

receive the beamforming feedback information comprising channel information related to a number $N_{CB}$ of bonded channel, wherein the beamforming feedback information is determined based on feedback subcarrier indices, wherein the feedback subcarrier indices determined based on a $N_g$ value of subcarrier groupings and the number $N_{CB}$ of bonded channel, wherein $N_{CB}$ is one of 1, 2, 3 and/or 4, wherein when $N_{CB}$ is equal to 1, the feedback subcarrier indices based on $N_g$ comprises:

a subcarrier index −177;

first subcarrier indices having the distance equal to multiple of $N_g$ from a subcarrier index −2 between the subcarrier index −177 and the subcarrier index −2;

the subcarrier index −2;

a subcarrier index 2;

second subcarrier indices having the distance equal to multiple of $N_g$ from the subcarrier index 2 between the subcarrier index 2 and the subcarrier index 177; and a subcarrier index 177, and wherein when $N_{CB}$ is equal to N+1, the feedback subcarrier based on $N_g$ indices comprises, wherein N is equal to or larger than 1:

first feedback subcarrier indices based on $N_g$ in case that $N_{CB}$ is equal to N, wherein the first feedback subcarrier indices based on $N_g$ comprises edge subcarrier indices based on $N_g$ in case that $N_{CB}$ is equal to N, wherein the edge subcarrier indices based on $N_g$ in case that $N_{CB}$ is equal to N comprise a first edge subcarrier index and a second edge subcarrier index, wherein the first edge subcarrier index is smaller than the second edge subcarrier index;

edge subcarrier indices based on $N_g$ in case that $N_{CB}$ is equal to N+1, wherein the edge subcarrier indices based on $N_g$ in case that $N_{CB}$ is equal to N+1 comprises a third edge subcarrier index and a fourth edge subcarrier index, wherein the third edge subcarrier index is smaller than the fourth edge subcarrier index;

third subcarrier indices having a distance equal to multiple of $N_g$ from the first edge subcarrier index between the first edge subcarrier index and the third edge subcarrier index; and fourth subcarrier indices having the distance equal to multiple of $N_g$ from the second edge subcarrier index between the second edge subcarrier index and the fourth edge subcarrier index.

* * * * *